(12) United States Patent
Hirabe

(10) Patent No.: US 10,044,093 B2
(45) Date of Patent: Aug. 7, 2018

(54) ANTENNA ORIENTATION ADJUSTMENT DEVICE AND ANTENNA ORIENTATION ADJUSTMENT METHOD

(71) Applicant: NEC Corporation, Tokyo (JP)

(72) Inventor: Masashi Hirabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/115,732

(22) PCT Filed: Jan. 8, 2015

(86) PCT No.: PCT/JP2015/000057
§ 371 (c)(1),
(2) Date: Aug. 1, 2016

(87) PCT Pub. No.: WO2015/118796
PCT Pub. Date: Aug. 13, 2015

(65) Prior Publication Data
US 2017/0179566 A1   Jun. 22, 2017

(30) Foreign Application Priority Data
Feb. 4, 2014 (JP) .................... 2014-019265

(51) Int. Cl.
*H01Q 1/12* (2006.01)
*H01Q 3/02* (2006.01)
(Continued)

(52) U.S. Cl.
CPC ............ *H01Q 1/1257* (2013.01); *H01Q 3/02* (2013.01); *H04B 17/102* (2015.01); *H04B 17/27* (2015.01)

(58) Field of Classification Search
CPC ........ H01Q 3/02; H01Q 1/257; H01B 17/102; G01R 29/10
(Continued)

(56) References Cited

U.S. PATENT DOCUMENTS 8,451,171 B1    5/2013  Santoru
2002/0164945 A1  11/2002  Olsen et al.
(Continued)

FOREIGN PATENT DOCUMENTS

JP   9-232847 A  *  9/1997
JP   H09-232847 A    9/1997
(Continued)

OTHER PUBLICATIONS

International Search Report corresponding to PCT/JP2015/000057 dated Feb. 24, 2015 (one page).
(Continued)

*Primary Examiner* — Huedung Mancuso
(74) *Attorney, Agent, or Firm* — Wilmer Cutler Pickering Hale and Dorr LLP

(57) ABSTRACT

An antenna orientation adjustment device (200) include a camera (210), nut runners (220 and 230), and a motion controller (400). The nut runners (220 and 230) can be mounted on an azimuth adjustment bolt (160) and an elevation adjustment bolt (180), respectively. The nut runners (220 and 230) change the orientation of an antenna unit by applying motor power to the azimuth adjustment bolt (160) and the elevation adjustment bolt (180). The motion controller (400) calculates an angle position of the antenna unit (110) where a reception strength is maximum based on an image taken by the camera (210) and a reception strength of radio waves received by the antenna unit (110), and then adjusts the antenna unit (110) to the angle position where the reception strength is maximum by supplying a drive signal to the azimuth adjustment bolt (160) and the elevation adjustment bolt (180).

6 Claims, 22 Drawing Sheets

(51) Int. Cl.
*H04B 17/10* (2015.01)
*H04B 17/27* (2015.01)

(58) Field of Classification Search
USPC .......................................................... 343/703
See application file for complete search history.

(56) References Cited

U.S. PATENT DOCUMENTS

| | | |
|---|---|---|
| 2007/0066233 A1 | 3/2007 | Smith et al. |
| 2009/0228166 A1* | 9/2009 | Durkos ................ G05D 1/0219 701/26 |
| 2012/0021690 A1 | 1/2012 | Smith et al. |
| 2013/0328716 A1* | 12/2013 | Le Sage .................. G01S 19/53 342/357.36 |
| 2015/0357708 A1* | 12/2015 | Au ........................... H01Q 3/08 343/760 |
| 2016/0141744 A1 | 5/2016 | Smith et al. |

FOREIGN PATENT DOCUMENTS

| | | | |
|---|---|---|---|
| JP | 2000-315907 A | * | 11/2000 |
| JP | 2000-315907 A | | 11/2000 |
| JP | 2005-072780 A | | 3/2005 |
| JP | 2007-033380 A | | 2/2007 |
| JP | 2007-088576 A | | 4/2007 |

OTHER PUBLICATIONS

Extended European Search Report issued by the European Patent Office for European Application No. 15745964.5 dated Aug. 4, 2017 (8 pages).

* cited by examiner

ANTENNA ORIENTATION ADJUSTMENT DEVICE AND ANTENNA ORIENTATION ADJUSTMENT METHOD

CROSS-REFERENCE TO RELATED APPLICATIONS

This application is a national stage application of International Application No. PCT/JP2015/000057 entitled "Antenna Orientation Adjustment Device and Antenna Orientation Adjustment Method" filed on Jan. 8, 2015, which claims priority to Japanese Application No. 2014-019265 filed on Feb. 4, 2014, the disclosures of which are hereby incorporated by reference in their entirety.

TECHNICAL FIELD

The present invention relates to an antenna orientation adjustment device and an antenna orientation adjustment method that adjust the orientation of an antenna.

BACKGROUND ART

When installing a directional antenna, it is important to place it so that it is orientated toward an appropriate direction in order to maximize the reception level. Currently, when adjusting the antenna orientation, a worker seeks to determine the orientation with the maximum reception level by a process of trial and error in which the antenna orientation is changed in a step-by-step manner and installs the antenna at that orientation.

However, because two orientations, the elevation and the azimuth, need to be set to adjust the antenna orientation, it is extremely difficult in practice to set the antenna orientation (i.e., orientate the antenna) toward the direction in which the maximum reception level can be achieved. It is time-consuming work to set the antenna toward the direction with the maximum reception level in a step-by-step manner by making a fine adjustment of the elevation and the azimuth by checking the reception level each time.

Since radio waves at millimeter-wave frequencies have been used recently, it is required to set the antenna orientation with respect to the wave source antenna with a level of accuracy equivalent to the accuracy needed to thread the eye of a needle. For example, extremely fine angle adjustment of 1.0° or less, such as 0.4° or 0.2°, is required today. Regarding the case of mounting the antenna on a mast or the like using a mounting bracket, it should take less than one turn of a mounting screw to mount the antenna. Considerable experience is needed to accurately adjust the antenna orientation by trial and error without any criteria like an index.

Methods for assisting in setting the antenna orientation toward the wave source direction have been proposed (for example, Patent Literatures 1, 2 and 3). For example, Patent Literature 1 discloses a direction finder that searches for a radio emitting source. The direction finder includes a direction finding array antenna and a camera mounted on the array antenna. A lens of the camera is aligned so that its optical axis is substantially orthogonal to the vertical plane of the array antenna. In this structure, an image of an object that is assumed to be a radio emitting source is taken by the camera. Further, a received signal that is received by the array antenna is visualized by a technique such as radio holography and output as a wave source image. Then, a screen, on which the camera image and the wave source image are displayed and superimposed on one another, is provided to a worker. By viewing the screen, the worker can specify the object as the radio emitting source.

In Patent Literature 2 and 3, a camera that is aligned with respect to an antenna is mounted on the antenna, and the camera is used as a sighting device. A radio emitting source is specified by the camera, and the orientation of the antenna is adjusted so that the radio emitting source comes at the center of the screen. In this manner, specifying the radio emitting source by the camera or using the camera as the sighting device is helpful in adjusting the antenna orientation.

CITATION LIST

Patent Literature

PTL1: Japanese Unexamined Patent Application Publication No. 2007-33380
PTL2: Japanese Unexamined Patent Application Publication No. 2007-88576
PTL3: Japanese Unexamined Patent Application Publication No. 2005-72780

SUMMARY OF INVENTION

Technical Problem

However, it is considered that the techniques disclosed in Patent Literature 1, 2 and 3 have the following problems. First, it is not easy to align the optical axis of the camera toward the antenna reception direction with high accuracy. An alignment error needs to be 1.0° or less, and it is impossible to manually align the optical axis of the camera with the antenna reception direction at the antenna installation site. Accordingly, an antenna manufacturer needs to manufacture and sell an antenna device with an aligned camera attached; however, attaching the camera to each antenna results in a considerable increase in costs.

Second, such a camera needs to have a substantial zooming feature. A large optical device is required to take an image of the radio emitting source at a distance of several hundred meters or several kilometers. This also causes a considerable increase in costs.

Third, there is a problem that the radio emitting direction from the radio emitting source is not always vertical to the antenna plane of the radio emitting source. When the radio emitting direction is deviated even slightly from the antenna plane, even if the antenna orientation is adjusted in the correct direction to the antenna plane of the radio emitting source, it is not necessarily the orientation where the maximum reception level is achieved.

An exemplary object of the present invention is to provide an antenna orientation adjustment device and an antenna orientation adjustment method that can adjust the orientation of an antenna with high accuracy in a simple and inexpensive structure.

Solution to Problem

An antenna orientation adjustment device according to an exemplary aspect of the present invention is an antenna orientation adjustment device that adjusts an orientation of an antenna unit in an antenna device including the antenna unit and an orientation adjustment part that changes the orientation of the antenna unit, the device including a camera that is fixed relative to an antenna unit, a motor-driven unit that can be mounted on an orientation adjustment part and changes an orientation of the antenna unit by applying a force of motor power to the orientation adjustment part, and a motion controller that adjusts the orientation of the antenna unit by supplying a drive signal to the motor-driven unit, and the motion controller obtains an angle position of the antenna unit based on an image taken by the camera and a reception strength of radio waves received by the antenna unit, and adjusts the angle position of the antenna unit by supplying a drive signal to the motor-driven unit.

An antenna orientation adjustment method according to an exemplary aspect of the present invention is an antenna orientation adjustment method that adjusts an orientation of an antenna unit in an antenna device including the antenna unit and an orientation adjustment part that changes the orientation of the antenna unit, the method including a step of mounting a camera on an antenna device so that a position and an orientation are not displaced relative to an antenna unit of the antenna device, a step of mounting a motor-driven unit on an orientation adjustment part, a step of calculating an angle position of the antenna unit based on an image taken by the camera and a reception strength of radio waves received by the antenna unit, and a step of adjusting the angle position of the antenna unit by supplying a drive signal to the motor-driven unit.

Advantageous Effects of Invention

According to the exemplary aspects of the present invention, it is possible to quickly and accurately install an antenna device.

DESCRIPTION OF EMBODIMENTS

Figure 1:
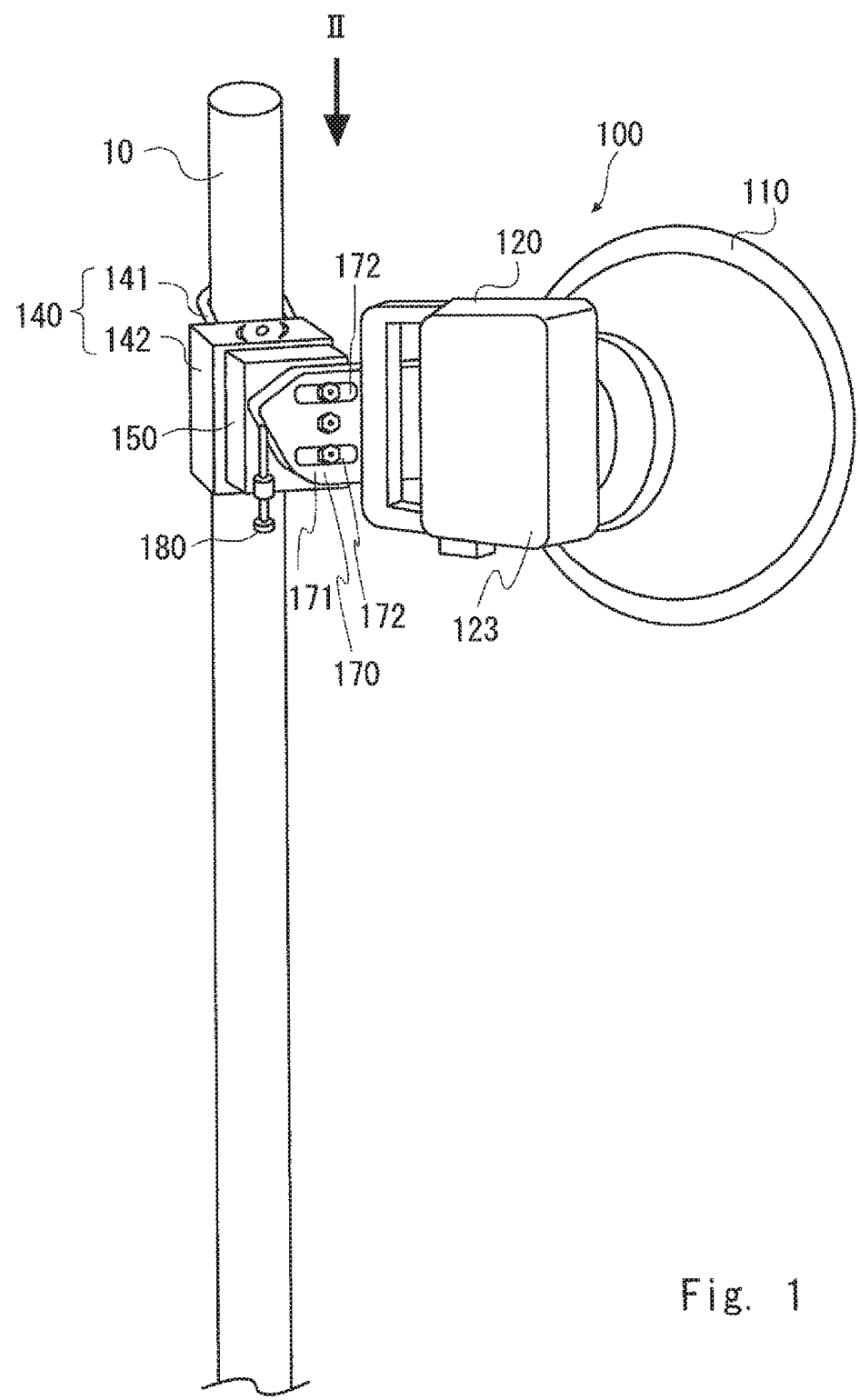
FIG. 1 is an external view of an antenna device.

Exemplary embodiments of the present invention are illustrated in the drawings and described hereinafter by referring to the reference symbols of elements in the drawings.

(First Exemplary Embodiment)

A first exemplary embodiment of the invention is described hereinafter.

A principal point of this exemplary embodiment is the structure and the operation of an antenna orientation adjustment device that adjusts the orientation of an antenna. However, prior to describing the adjustment of the antenna orientation, the structure of an antenna device 100 is schematically described hereinafter.

FIG. 1 is a view showing the antenna device 100. The antenna device 100 may be a known one. Although a so-called parabolic antenna is shown as an example, the type of the antenna is not particularly limited in the application of this exemplary embodiment. A directional antenna may be a planar antenna, for example.

FIG. 1 shows the antenna device 100 mounted on a mast 10 viewed from the back. The antenna device 100 includes an antenna unit 110, a transmitting and receiving unit 120, and a mounting means 130.

The antenna unit 110 is a parabolic antenna in this example. The transmitting and receiving unit 120 is an electrical circuit unit that includes a receiving circuit 121 and a transmitting circuit 122 (see FIG. 7) and performs modulation and demodulation of signals according to the need. The transmitting and receiving unit 120 includes a storage box 123 that serves as a housing and electrical circuit units (121, 122) stored in the storage box 123, and it is coupled to the backside of the antenna unit 110.

The mounting means 130 installs and fixes the antenna unit 110 and the transmitting and receiving unit 120. The case where the antenna unit 110 and the transmitting and receiving unit 120 are fixed to the mast 10 is shown as an example.

The mounting means 130 includes a clamp unit 140, an azimuth direction movable member 150, an azimuth adjustment bolt (orientation adjustment part) 160, an elevation direction movable member 170, and an elevation adjustment bolt (orientation adjustment part) 180.

The clamp unit 140 includes a U-bolt 141 and a bracket 142. The U-bolt 141 has a U shape to enclose the mast 10, so that the mast 10 is held between the U-bolt 141 and the bracket 142 on the backside of the bracket 142. The bracket 142 has a hollow rectangular shape with one open side to accommodate the azimuth direction movable member 150.

The front side of the bracket 142 is open to accommodate the azimuth direction movable member 150.

The azimuth direction movable member 150 is supported rotatably about an axis, accommodated inside the bracket 142. The axis line of the rotation axis is vertical, and the azimuth direction movable member 150 can be displaced in the azimuth direction by this rotation axis.

Regarding the rotation axis, the description of the axis line direction of the rotation axis is in consideration of a general installation state of the antenna device 100. Note that, however, regarding the degree of freedom of moving the antenna unit 110, it is enough with two axes that can rotate independently of each other, and therefore the axis line direction of the rotation axis is not limited to the direction of gravity such as a vertical or horizontal direction.

Figure 2:
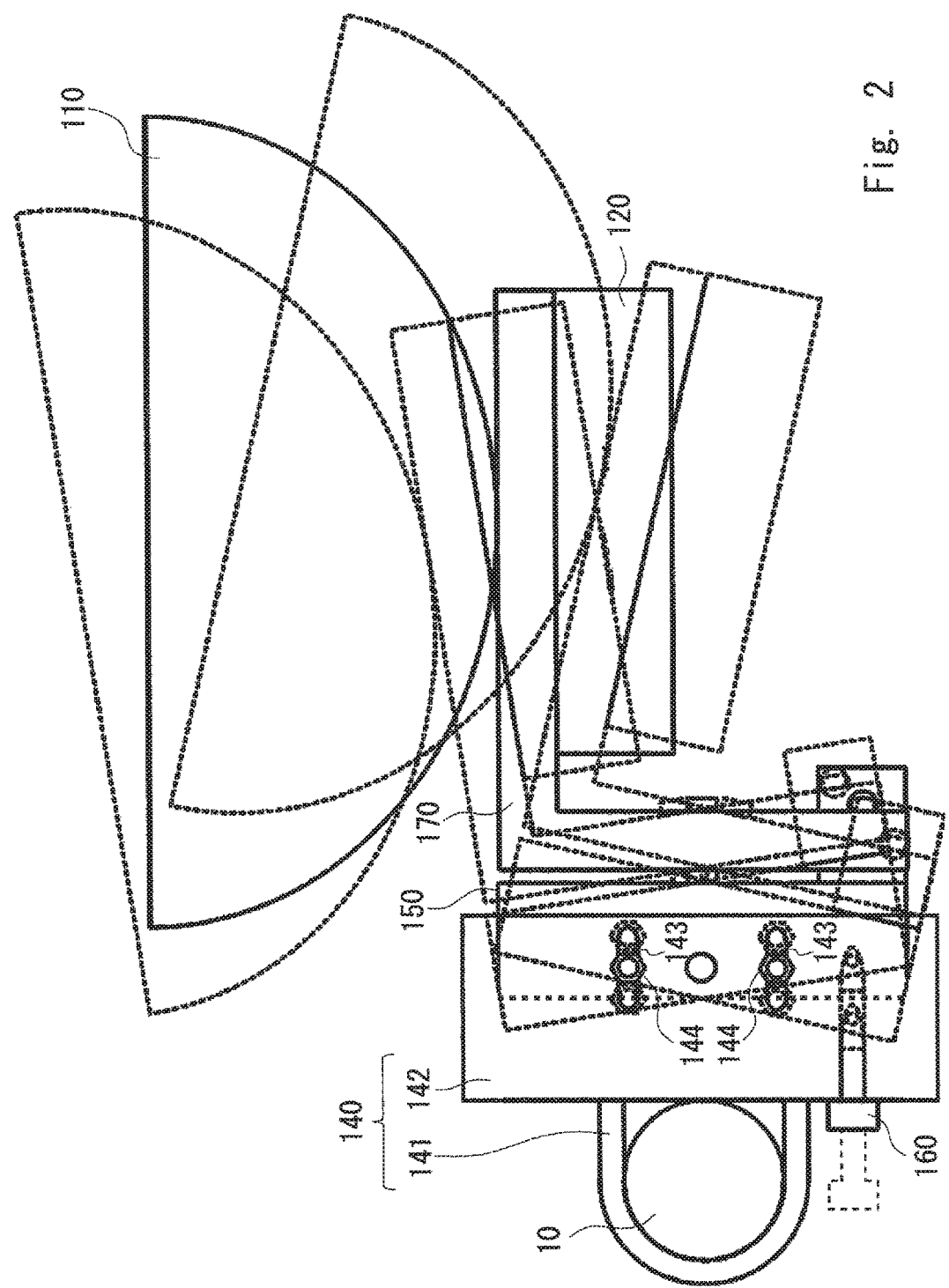
FIG. 2 is a top view of the antenna device.
Figure 3:
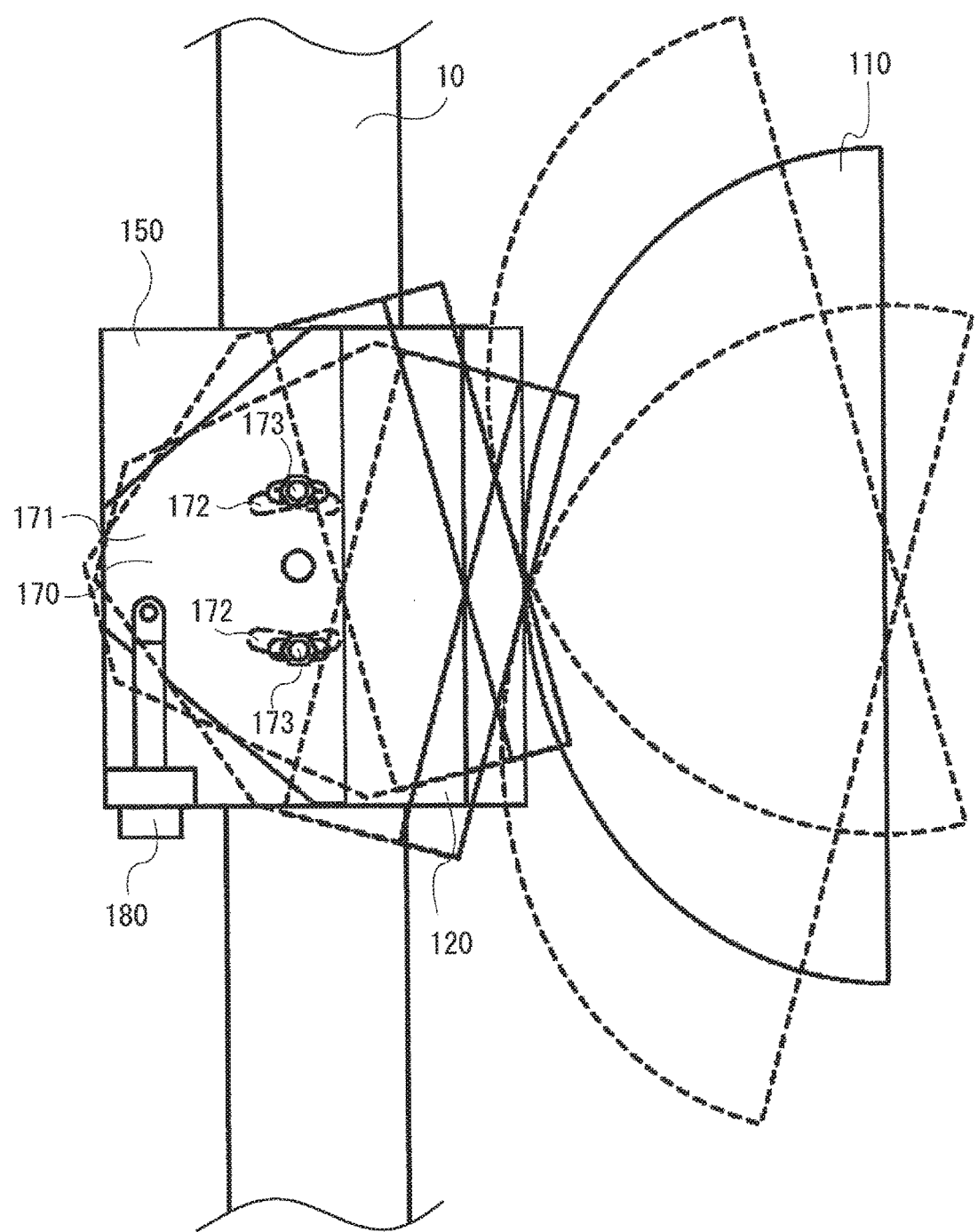
FIG. 3 is a side view of the antenna device.

FIG. 2 is a view viewed from the direction II in FIG. 1. In other words, FIG. 2 is a view showing the antenna device 100 viewed from above. A side surface of the bracket 142 has two long holes 143 and 143 with the rotation axis placed therebetween, and screws 144 and 144 are inserted into the long holes 143 and 143 and screwed into the azimuth direction movable member 150. By adjusting the degree of fastening the screws 144 and 144, it is possible to switch between the movable state and the fixed state of the azimuth direction movable member 150.

The azimuth adjustment bolt 160 is inserted from the backside of the bracket 142 and its head is coupled to the backside of the azimuth direction movable member 150. When the azimuth adjustment bolt 160 is turned to move forward or backward, the azimuth direction movable member 150 is pushed or pulled, and thereby the azimuth direction movable member 150 rotates around the rotation axis. Stated differently, the azimuth of the azimuth direction movable member 150 is changed by the operation of turning the azimuth adjustment bolt 160. Thus, the azimuth adjustment bolt 160 serves as an orientation adjustment part that changes the orientation (azimuth) of the antenna unit by the application of a force.

The elevation direction movable member 170 is mounted on the front side of the azimuth direction movable member 150. The elevation direction movable member 170 is attached to the azimuth direction movable member 150 at the base end 171 of the elevation direction movable member 170 and coupled to the backside of the antenna unit 110 at the front side. The base end 171 of the elevation direction movable member 170 is supported rotatably about an axis by the azimuth direction movable member 150. The rotation axis is horizontal, and the elevation direction movable member 170 can be displaced in the elevation direction by the rotation axis. The base end 171 of the elevation direction movable member 170 has two long holes 172 and 172 with the rotation axis placed therebetween, and screws 173 and 173 are inserted into the long holes 172 and 172 and screwed into the azimuth direction movable member 150. By adjusting the degree of fastening the screws 173 and 173, it is possible to switch between the movable state and the fixed state of the elevation direction movable member 170.

The base end 171 of the elevation direction movable member 170 is provided with an elevation adjustment bolt 180 that hangs down substantially vertically, and the elevation adjustment bolt 180 is screwed with the azimuth direction movable member 150. By turning the elevation adjustment bolt 180 so that it moves forward or backward, the base end 171 of the elevation direction movable member 170 can be pushed up or pulled down, and thereby the elevation of the elevation direction movable member 170 is changed. Thus, the elevation adjustment bolt 180 serves as an orientation adjustment part that changes the orientation (elevation) of the antenna unit by the application of a force.

It would be understandable that the antenna device 100 having the above structure can adjust the azimuth and the elevation of the antenna unit 110 independently of each other.

Because the antenna unit 110 is coupled to the front end of the elevation direction movable member 170, it can change the elevation of the antenna unit 110 together with the elevation direction movable member 170. The elevation adjustment bolt 180 is turned at this time. Further, because the base end 171 of the elevation direction movable member 170 is attached to the azimuth direction movable member 150, the elevation direction movable member 170 and the antenna unit 110 can change the azimuth together with the azimuth direction movable member 150. The azimuth adjustment bolt 160 is turned at this time.

An antenna orientation adjustment device 200 is descried hereinafter.

Figure 4:
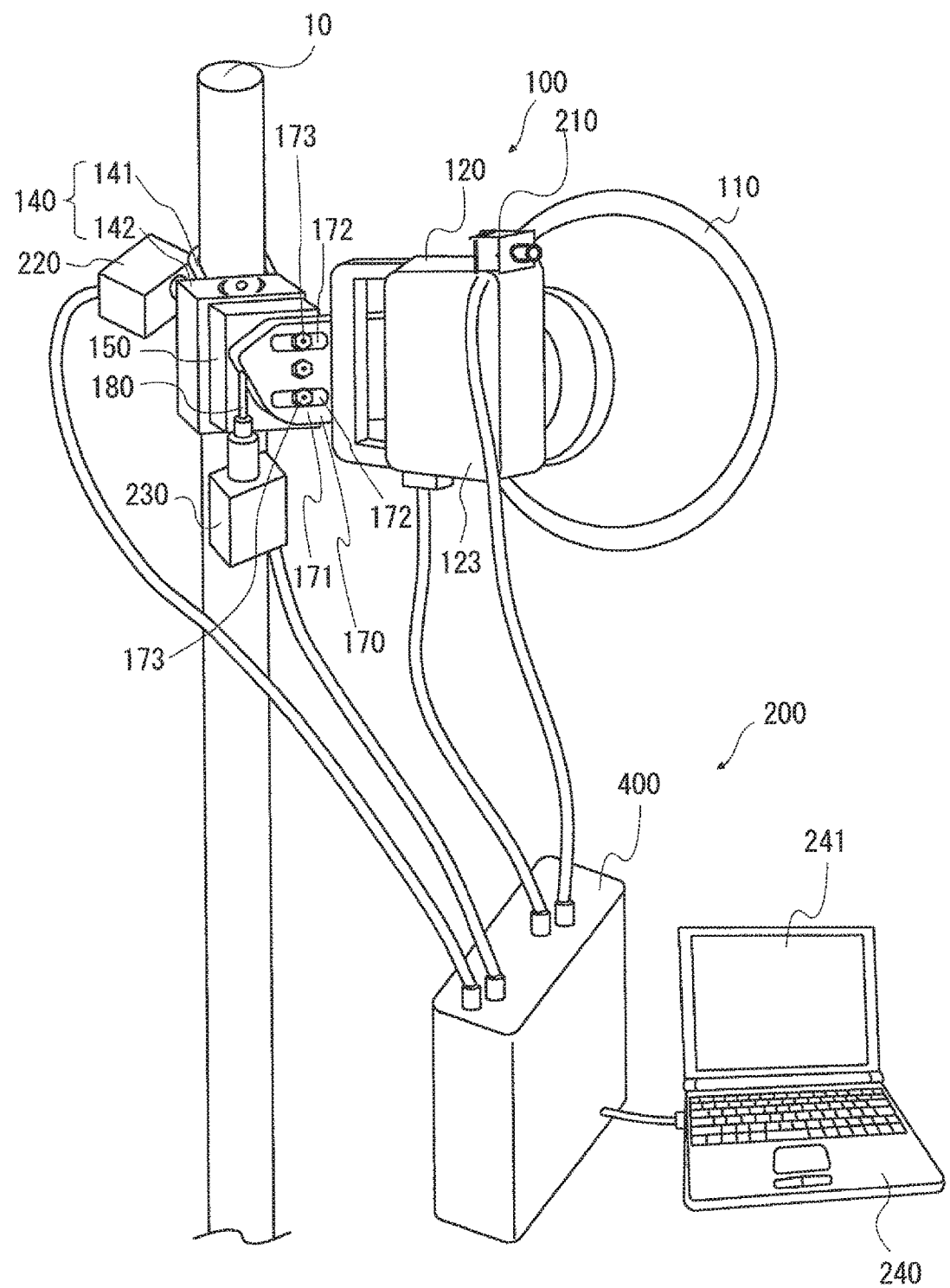
FIG. 4 is a view showing the state where an antenna orientation adjustment device is attached to the antenna device.

FIG. 4 is a view showing the state where the antenna orientation adjustment device 200 is attached to the antenna device 100.

The antenna orientation adjustment device 200 includes a camera 210, two nut runners (motor-driven units) 220 and 230, a motion controller 400, and a personal computer 240. A system in which the antenna orientation adjustment device 200 is attached to the antenna device 100 is referred to as an antenna system.

A worker who installs the antenna device 100 conducts work to mount the camera 210 and the nut runners 220 and 230 on the antenna device 100. After that, the orientation of the antenna unit 110 is adjusted semi-automatically. This is described hereinbelow.

Note that the personal computer 240 is included only for convenience of using input and output means (a keyboard and a display), and the personal computer 240 is not needed if an input means and an output means are incorporated into the motion controller 400. The input means in this case is a keyboard, a touch panel, various types of switches, various types of push buttons or the like. The output means is typically a liquid crystal monitor.

The camera 210 may be a digital camera or a portable terminal (for example, a mobile phone) with a camera function. In FIG. 4, the camera 210 is mounted on the back of the antenna unit 110, and the direction in which the lens of the camera 210 takes an image has no relation to the direction in which the antenna device 100 receives radio waves. Like in this example, the direction in which the camera 210 takes an image is arbitrary. Note that, however, as will be apparent from the following description, an object whose position is set (fixed) needs be within an imaging region. In other words, an imaging direction to merely take a sky image, for example, is of no use. It is preferred that a construct such as a building or a house, for example, appears in the image. Further, if possible, it is more preferred that an object with a clear color, shape or the like appears in the image. A worker who installs the antenna device 100 looks over the surroundings and roughly determines the orientation of the camera 210 so that the above-described construct appears in the image. Then, the worker fixedly mounts the camera 210 on an appropriate position on the antenna device 100.

In the case of mounting the camera 210 on the top surface of the storage box 123 as shown in FIG. 1, the easiest way is to attach the camera 210 to the storage box 123 using a double-sided tape. Note that, however, even when the easiest way is employed, it is necessary that the positions and orientations of the antenna unit 110 and the camera 210 are not displaced relative to each other. Stated differently, if the position or orientation of the antenna unit 110 changes, the position or orientation of the camera 210 should be changed in the same way.

Figure 5:
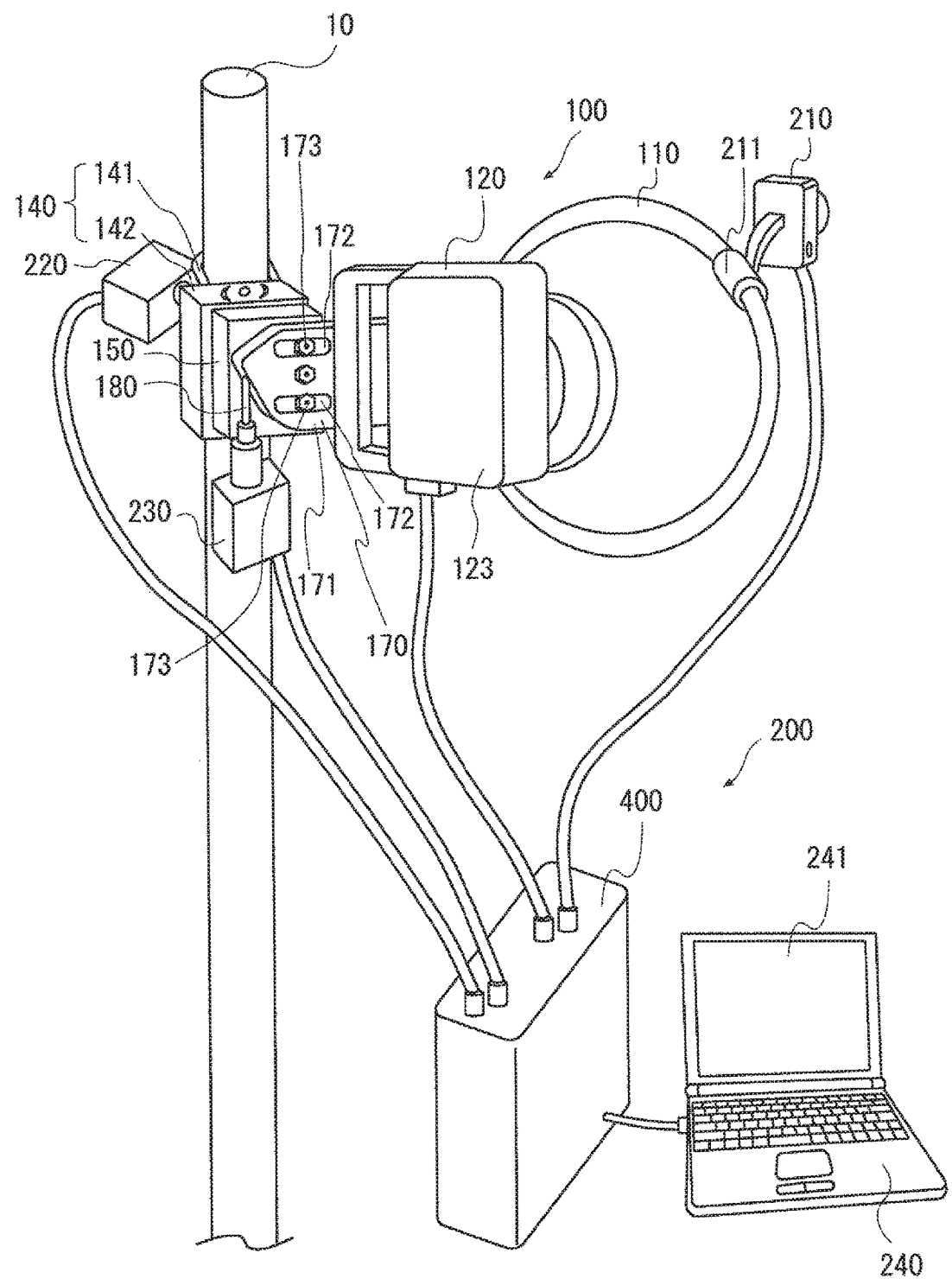
FIG. 5 is a view showing the state where the antenna orientation adjustment device is attached to the antenna device.

FIG. 5 shows, for reference, the case where the camera 210 is fixed to the antenna unit 110 using a given mounting jig 211. Like in this example, the camera 210 can face the same direction as the reception direction of the antenna unit 110 as a matter of course.

The nut runners 220 and 230 are electric power bolt screwdrivers that turn the azimuth adjustment bolt 160 and the elevation adjustment bolt 180. The nut runners 220 and 230 have the same structure. To distinguish between them, the nut runner that turns the azimuth adjustment bolt 160 is denoted by the reference number "220", and the nut runner that turns the elevation adjustment bolt 180 is denoted by the reference number "230".

Figure 6:
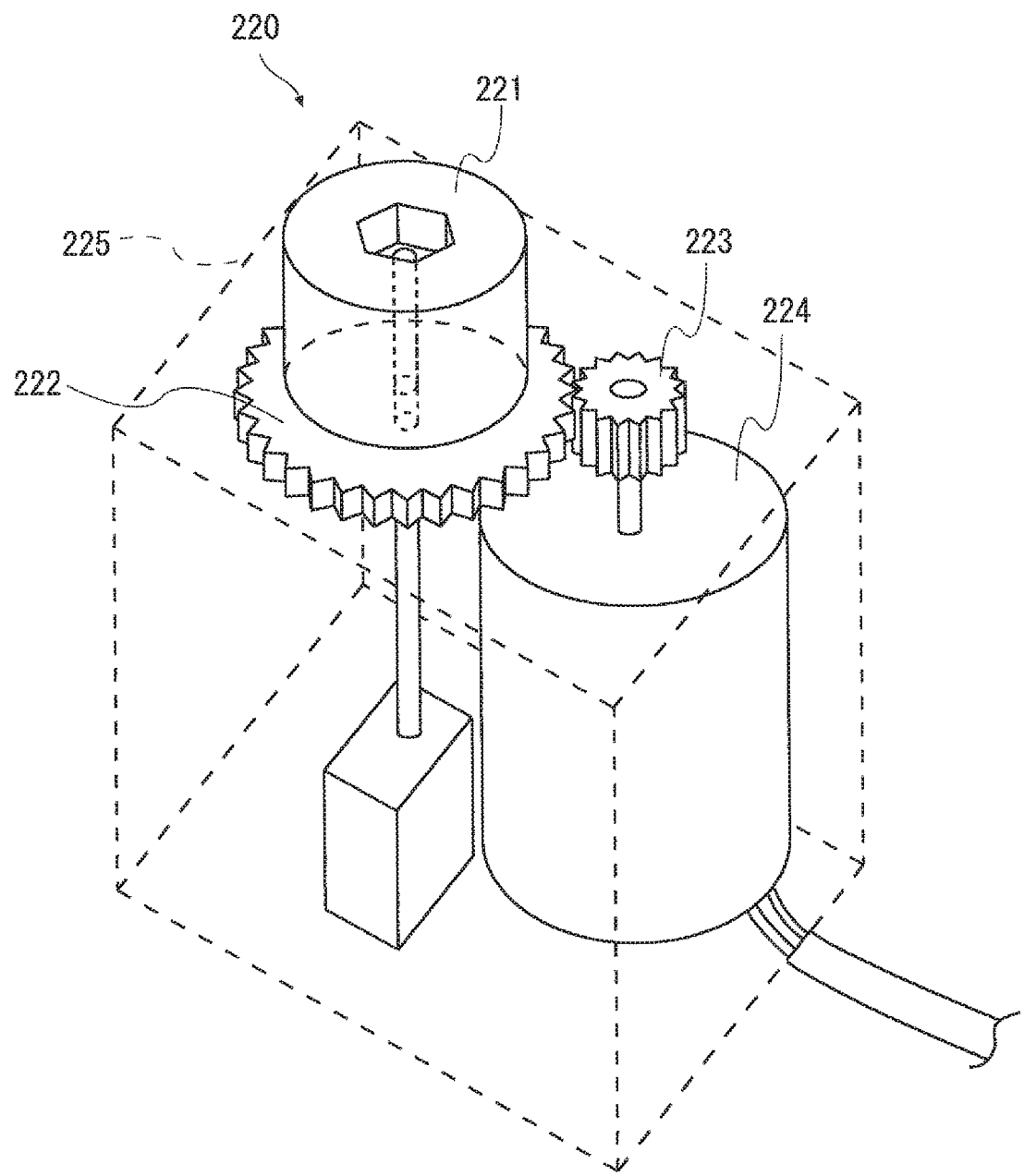
FIG. 6 is a view showing the structure of a nut runner.

FIG. 6 shows the structure of the nut runners 220 and 230. Because the nut runners 220 and 230 have the same structure, only the nut runner 220 is described as an example. (In the case of the nut runner 230, the second digit of the reference number is replaced with "3".) In FIG. 6, the nut runner 220 includes a nut 221, a gear 222 that rotates with the nut 221, a pinion 223 that meshes with the gear 222, and a motor 224 that drives the pinion 223 to rotate it. Note that, in FIG. 6, a housing 225 is shown by a dotted line to see through the inside thereof. As shown in FIG. 6, the hole of the nut 221 is rather deep to allow the bolts 160 and 180 to move forward or backward. It is thereby possible to prevent the screw heads of the bolts 160 and 180 and the base of the nut 221 from coming into contact with each other.

A worker mounts the nut 221 of the nut runner 220 on the screw head of the azimuth adjustment bolt 160 and mounts the nut of the nut runner 230 on the screw head of the elevation adjustment bolt 180 (see FIG. 4). The motors 224 and 225 are driven by a driving signal from the motion controller 400. When the motors 224 and 225 are driven, the pinions 223 and 233, the gears 222 and 232 and the nuts 221 and 231 rotate accordingly. In this manner, the azimuth adjustment bolt 160 and the elevation adjustment bolt 180 move forward or backward by driving the nut runners 220 and 230, and thereby the orientation (azimuth and elevation) of the antenna unit 110 is adjusted.

Figure 7:
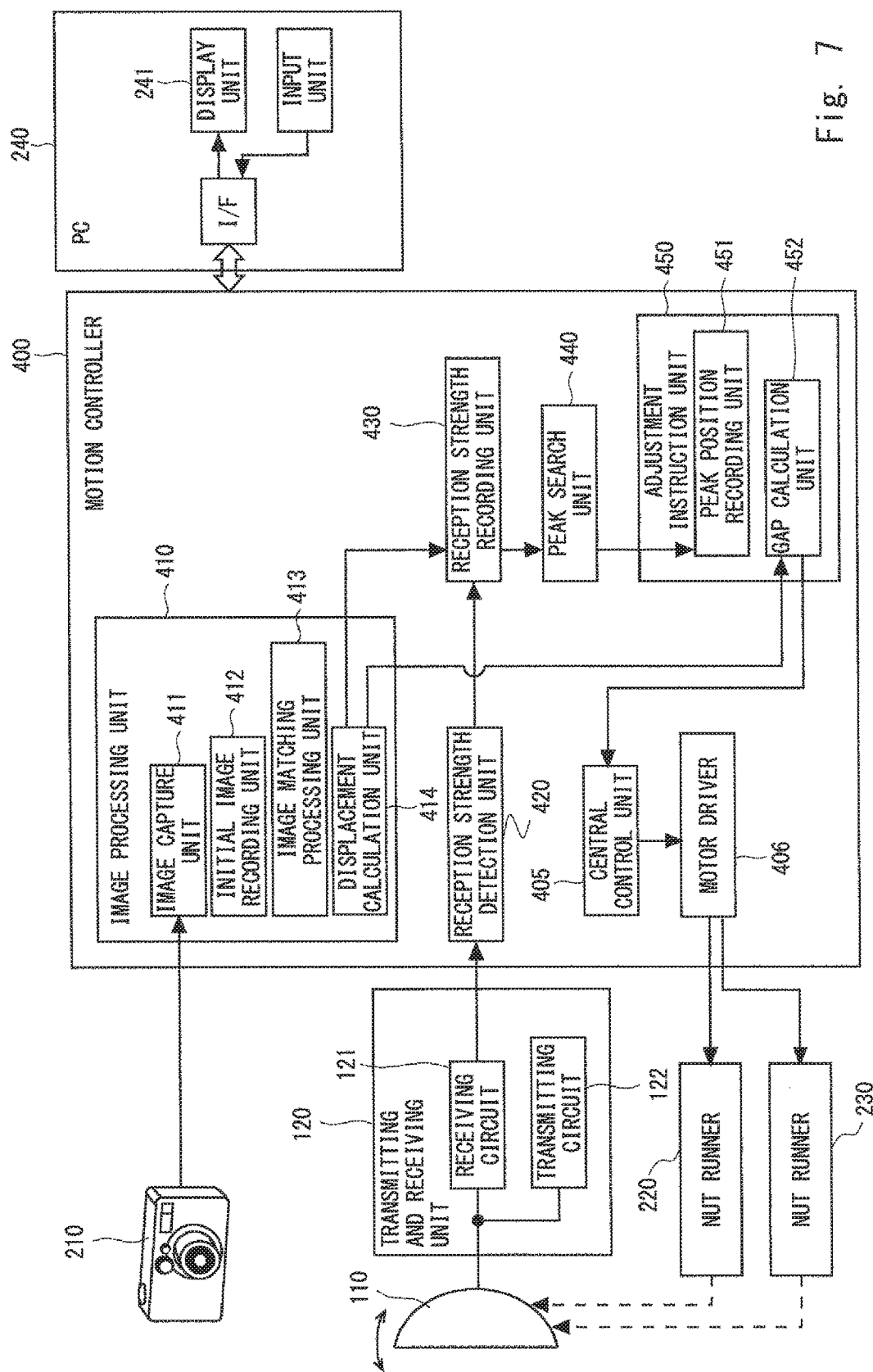
FIG. 7 is a functional block diagram of a motion controller.

FIG. 7 is a functional block diagram of the motion controller 400. In FIG. 7, the functions of the motion controller, except for a motor driver, may be implemented as a result of a CPU loading a program.

The motion controller 400 includes a central control unit 405, a motor driver 406, an image processing unit 410, a reception strength detection unit 420, a reception strength recording unit 430, a peak search unit 440, and an adjustment instruction unit 450.

Further, the image processing unit 410 includes an image capture unit 411, an initial image recording unit 412, an image matching processing unit 413, and a displacement calculation unit (position calculation unit) 414.

The adjustment instruction unit 450 includes a peak position recording unit 451 and a gap calculation unit 452.

The detailed operation of each functional unit is described later with reference to the flowchart and the illustration.

Figure 8:
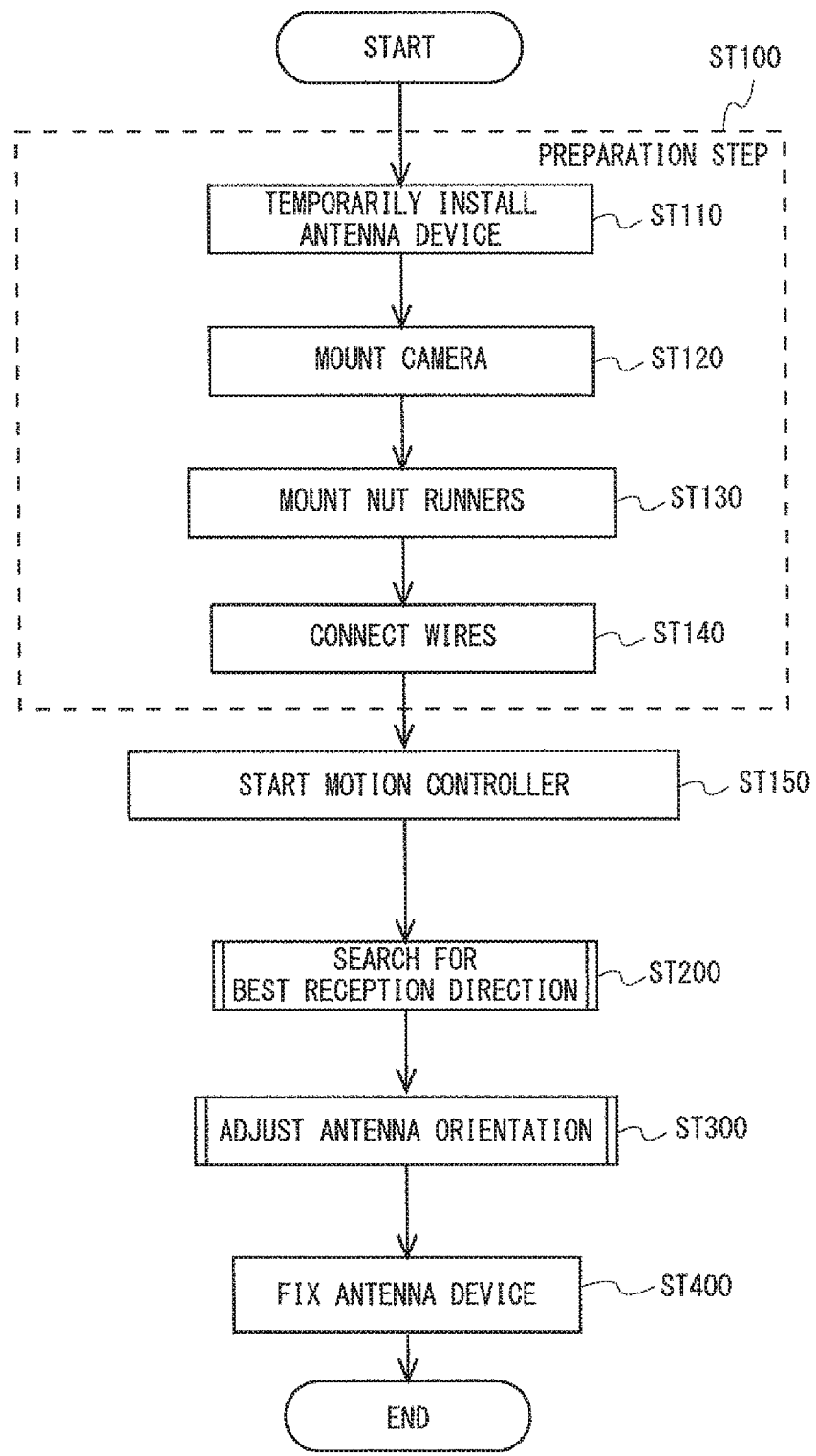
FIG. 8 is a flowchart showing a procedure of adjusting the orientation of the antenna orientation adjustment device to the most appropriate direction.

FIG. 8 is a flowchart showing a procedure of adjusting the antenna orientation to the most appropriate direction. The antenna orientation adjustment method broadly includes a preparation step (ST100), a step of searching for the best reception direction (ST200), a step of adjusting the antenna orientation (ST300), and a step of fixing the antenna device (ST400). Each step is described hereinbelow.

The preparation step (ST100) includes a step of temporarily installing the antenna device 100 (ST110), a step of mounting the camera 210 on the antenna device 100 (ST120), a step of mounting the nut runners on the azimuth adjustment bolt 160 and the elevation adjustment bolt 180 (ST130), a step of wiring (ST140), and a step of starting the motion controller (ST150).

The step of temporarily installing the antenna device 100 (ST110) is a step of installing the antenna device 100 at a specified installation place using the mounting means 130 as already shown in FIG. 1. In this step, the orientation of the antenna unit 110 may be adjusted roughly to a certain azimuth and elevation. For example, the orientation of the antenna unit 110 may be set toward an opposite station using a compass, or the orientation of the antenna unit 110 may be set to an opposite station after identifying the opposite station using a telescope. Note that, although a fine adjustment will be made later (ST300), the fine adjustment become difficult if there is a gap of as large as 10° or 20°. Thus, it is necessary to set the orientation of the antennas (i.e., orientate the antennas) to a degree that allows measurement of the reception strength level. For example, the gap is preferably within the range of about 5°, front and back, for example, with respect to the direction that is assumed to be the best, though it depends on the size and performance of the antenna. In general, there is a difference of about 20 dB to 30 dB between the reception strength required for communications and the minimum necessary reception strength required to measure the reception strength.

The step of mounting the camera 210 (ST120) is as described earlier with reference to FIG. 1. That is, a worker looks over the surroundings and roughly determines the orientation of the camera 210 so that a construct appears in the image if possible, and then fixedly mounts the camera 210 on an appropriate position on the antenna device 100.

The next step is to mount the nut runners 220 and 230 on the azimuth adjustment bolt 160 and the elevation adjustment bolt 180 (ST130). Specifically, the worker mounts the nut 221 of the nut runner 220 on the screw head of the azimuth adjustment bolt 160 and mounts the nut 231 of the nut runner 230 on the screw head of the elevation adjustment bolt 180.

After that, wires are connected to the motion controller 400 (ST140). First, the camera 210 and the motion controller 400 are connected together. Then, wiring is done so that the reception level of the antenna device 100 can be detected by the motion controller 400. To be specific, the receiving circuit 121 of the transmitting and receiving unit 120 is connected to the motion controller 400. Further, the nut runners 220 and 230 are connected to the motion controller 400.

Although an example where the camera 210 and the motion controller 400, and the antenna device 100 and the motion controller 400 are respectively connected by wire is shown in FIG. 1, they may be connected wirelessly.

Further, the nut runners 220 and 230 and the motion controller 400 may be connected wirelessly.

In this case, drivers are incorporated into the nut runners 220 and 230, and only control signals are transmitted wirelessly from the motion controller 400 to the nut runners 220 and 230.

After wiring is done, the motion controller 400 is started (ST140), and a specified program (antenna orientation adjustment program) is loaded. The preparation step (ST100) thereby ends.

Figure 9:
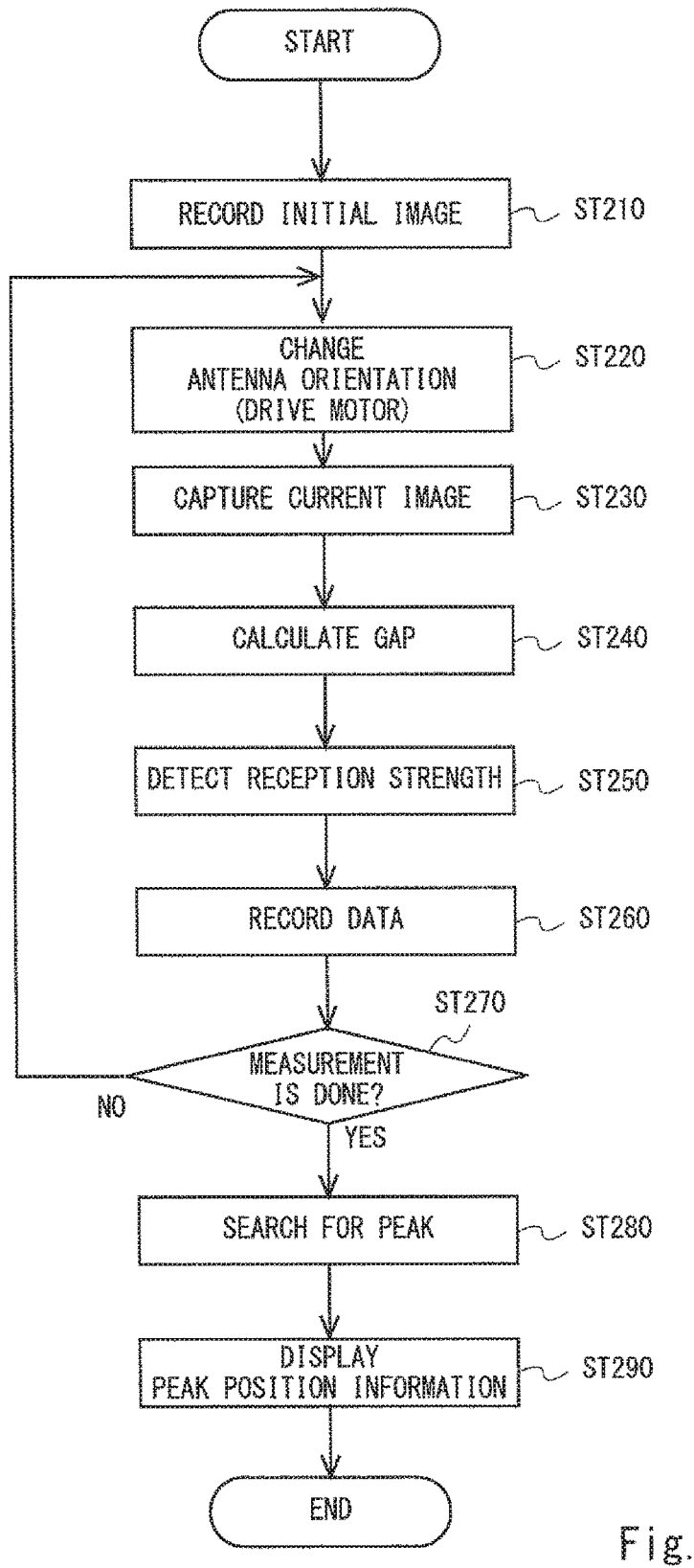
FIG. 9 is a flowchart showing a detailed procedure of a step of searching for the best reception direction.

Next, the step of searching for the best reception direction (ST200) is described. (Note that the step ST200 of searching for the best reception direction and the step ST300 of adjusting the antenna orientation are the process automatically performed by the motion controller 400). FIG. 9 is a flowchart showing a detailed procedure of the step of searching for the best reception direction (ST200). The first to be performed is the capture of an initial image. The camera 210 is already mounted on the antenna device 100, and the image capture unit 411 captures the current image in the camera 210 as an initial image (ST210).

Figure 10:
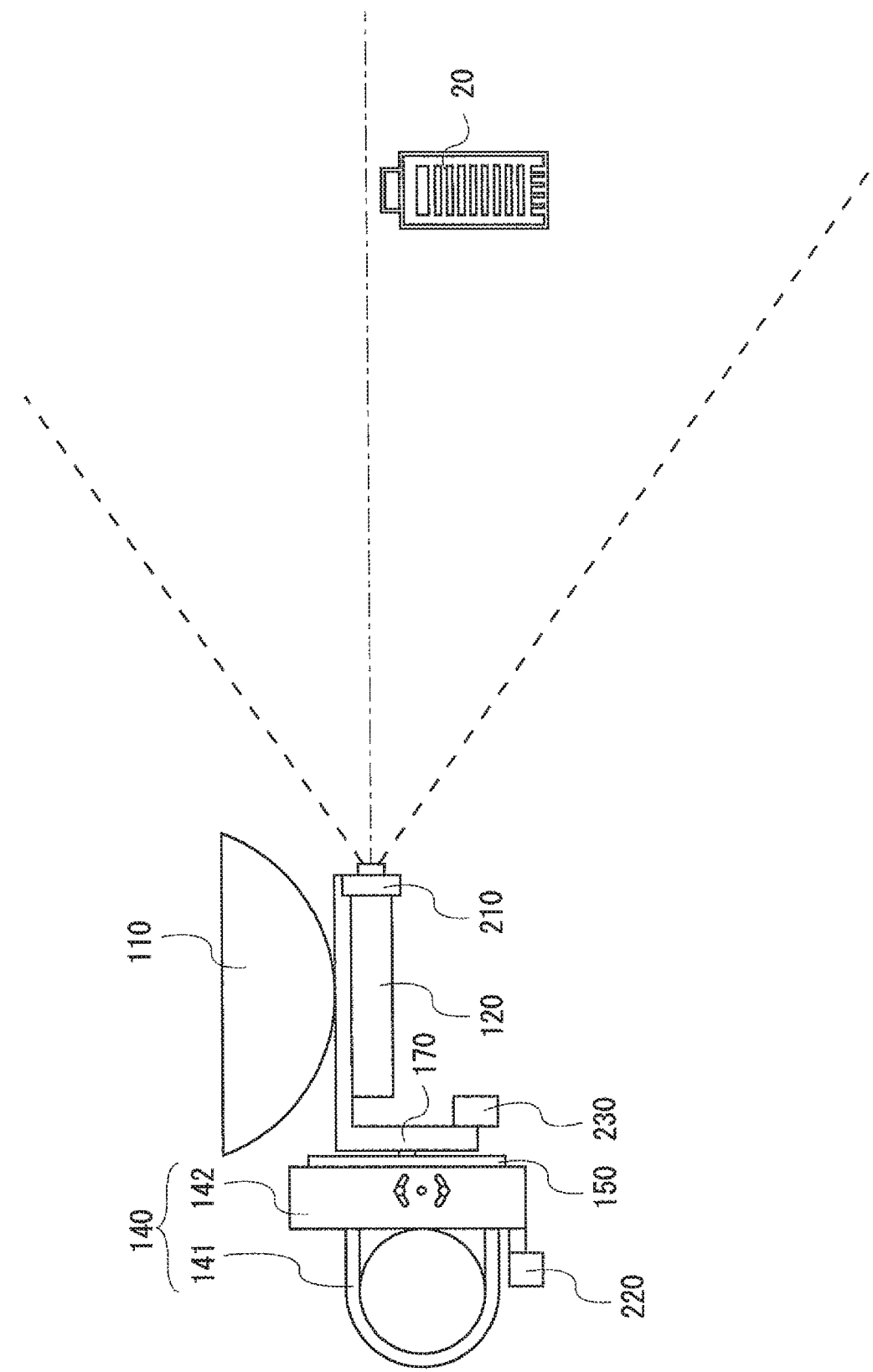
FIG. 10 is a view showing the antenna device viewed from above.
Figure 11:
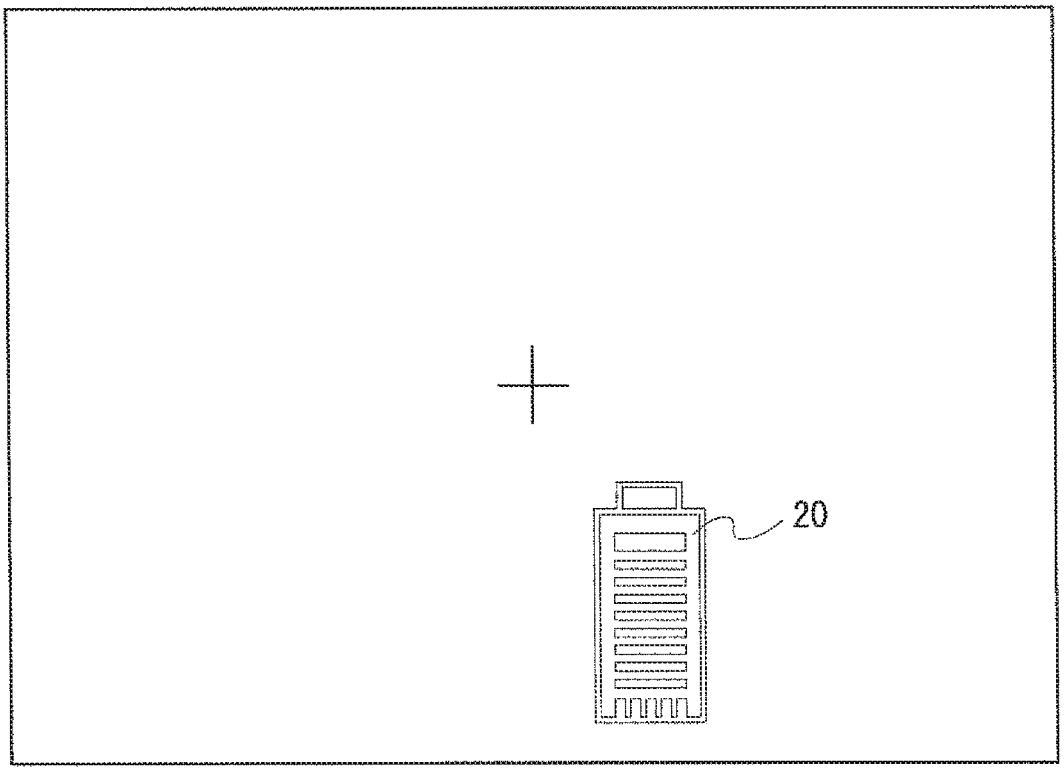
FIG. 11 is a view showing an example of a captured image.

FIG. 10 is a view showing the antenna device 100 viewed from above. (Stated differently, FIG. 10 is a view showing the antenna device 100 viewed from the direction of the arrow II in FIG. 1.) In FIG. 10, the imaging range of the camera 210 is indicated by the dotted line. (Note that the alternate long and short dashed line indicates the center line of the imaging range.) In the example of FIG. 10, it is assumed that a building 20 stands near the center of the imaging range of the camera 210. Accordingly, the building 20 appears near the center in the camera image as shown in FIG. 11. The camera image is displayed on a display unit 241 of the personal computer 240 through the image capture unit 411.

Note that, in the description of this specification, a display example on the display unit 241 is shown to visually represent the process performed by the motion controller 400 for a worker (and a reader of this specification). However, because the antenna orientation adjustment is automatically performed by the motion controller 400, there is basically no need to display the details of the process one by one.

Figure 12:
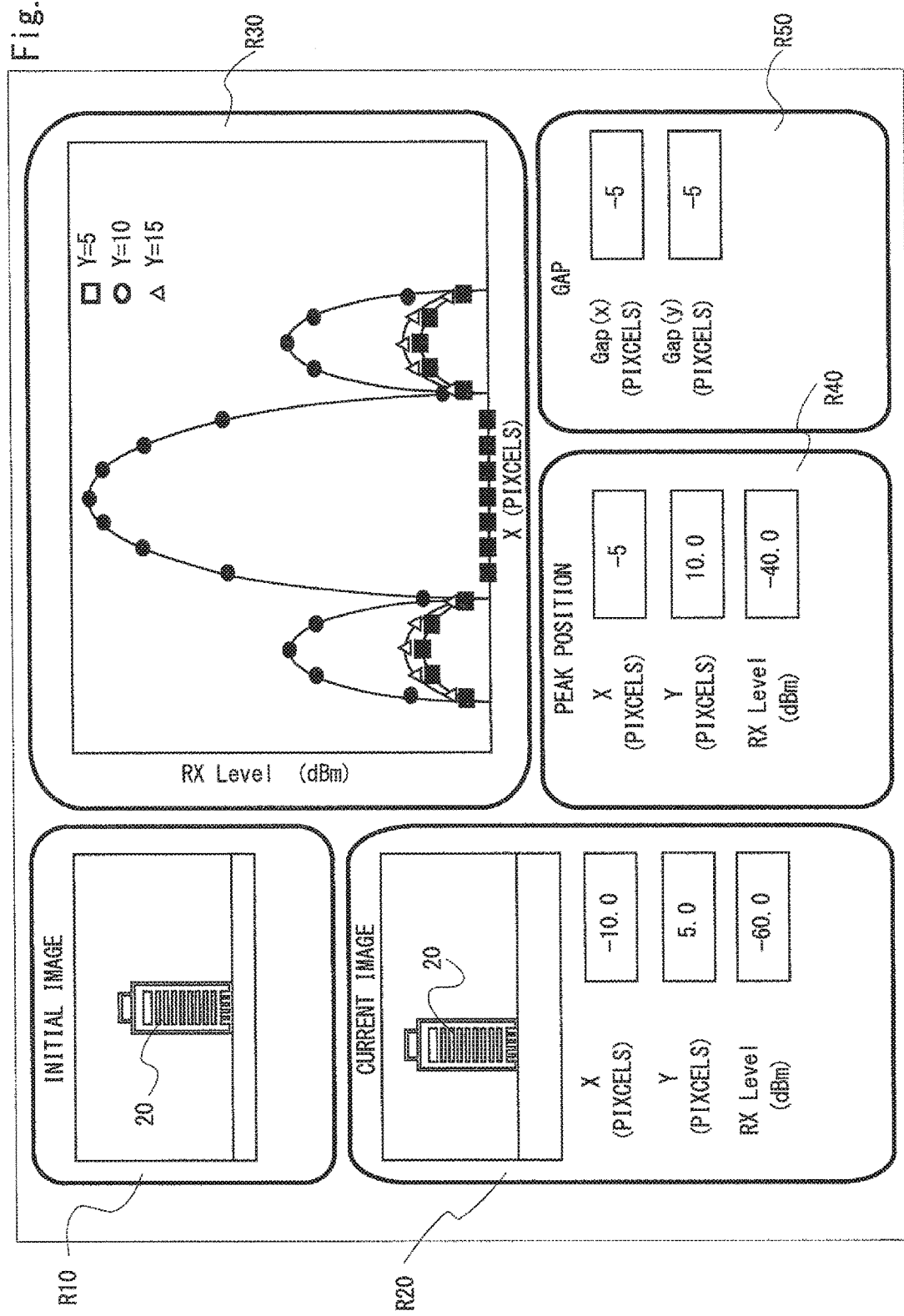
FIG. 12 is a view showing an example of a display screen.

FIG. 12 is a view showing an example of a display screen. The display screen is roughly divided into four regions, and the upper left region is an initial image display region R10 that displays the initial image. A worker views the image displayed in the initial image display region R10 and recognizes that an object (20) that can serve as a landmark appears in the image. The initial image is recorded and stored into the initial image recording unit 412.

After capturing the initial image (ST210), the central control unit 405 conducts work to slightly change the orientation of the antenna unit 110 (ST220). In this process (ST220), the central control unit 405 sends a control signal to the motor driver 406. In response to the control signal, the motor driver 406 sends a drive signal to the nut runners 220 and 230.

Figure 13:
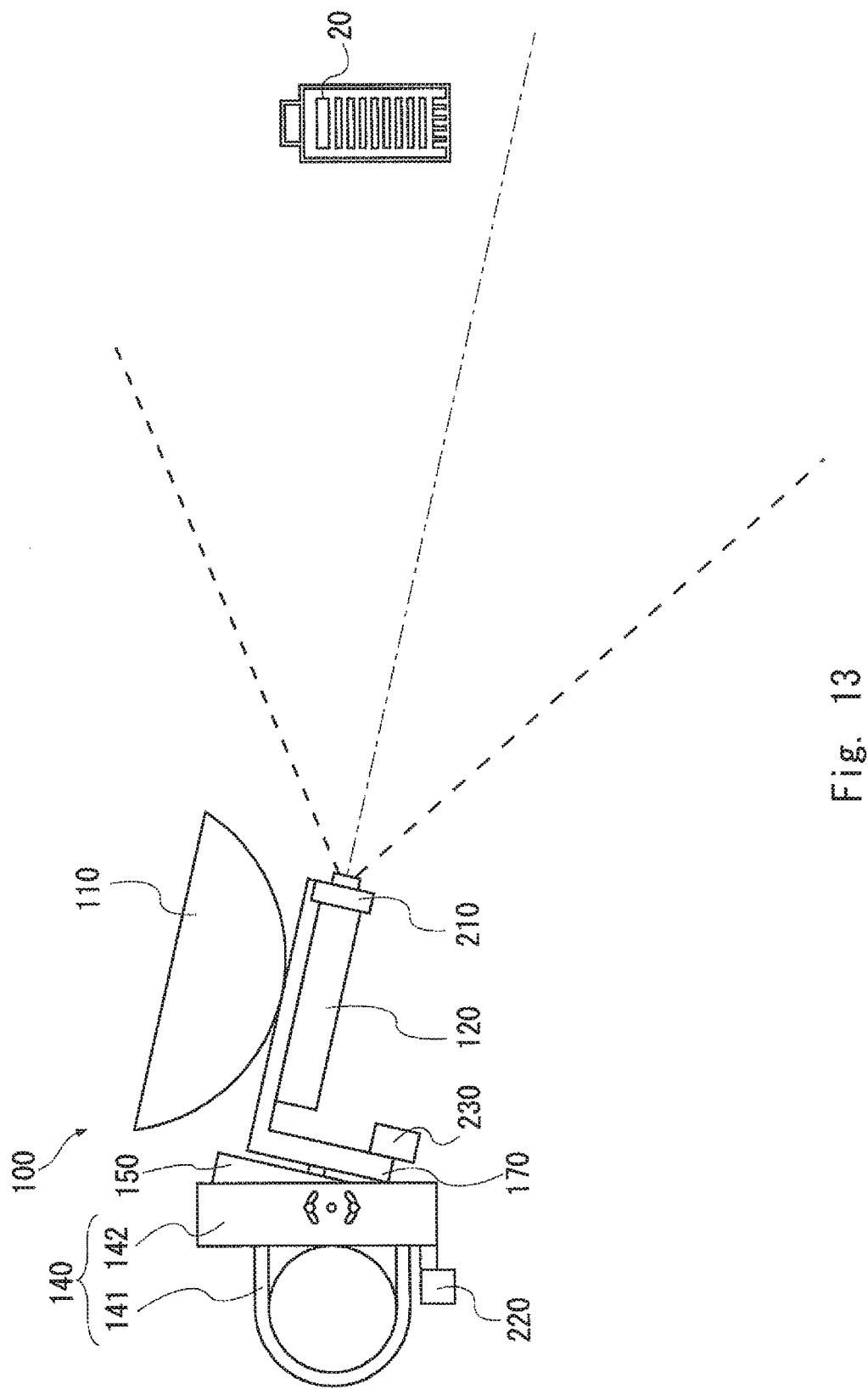
FIG. 13 is a view showing the state where the azimuth of the antenna unit is slightly shifted.
Figure 14:
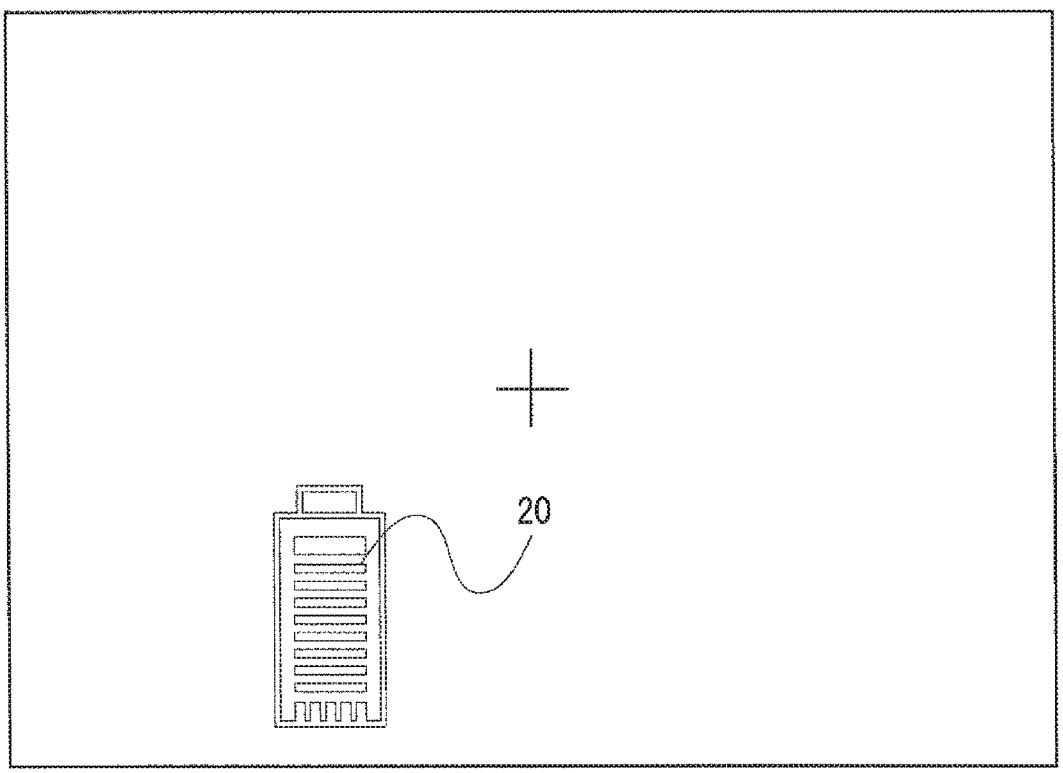
FIG. 14 is a view showing an example of a captured image.

FIG. 13 is a view showing the state where the azimuth of the antenna unit 110 is slightly shifted. (Although the azimuth is shifted about 10° in FIG. 13 to facilitate understanding for convenience of explanation, it is preferred in practice to shift the angle little by little (for example, 0.1° each time).) Because the camera 210 is displaced integrally with the antenna unit 110, the azimuth of the camera 210 also changes in the same way as that of the antenna unit 110. Accordingly, the imaging direction of the camera 210 changes. As a result, it is assumed that the building 20 is displaced slightly to the left in the imaging region as shown in FIG. 14. In the display screen of FIG. 12, it is assumed that the region below the initial image display region R10 is a current image display region R20 that displays the current image. With the current image display region R20, the worker can view the image that is currently captured by the camera 210 in real time.

The image that is taken by the camera 210 after its orientation is changed is the current image. The current image is captured by the image capture unit 411 (ST230). Then, the image processing unit 410 compares the current image with the initial image and thereby calculates a gap between the current image and the initial image (ST240). Comparing two images and recognizing the images to see how much one is deviated from the other is an application of pattern matching and implemented by various methods. For example, Phase-Only Correlation is known.

Figure 15:
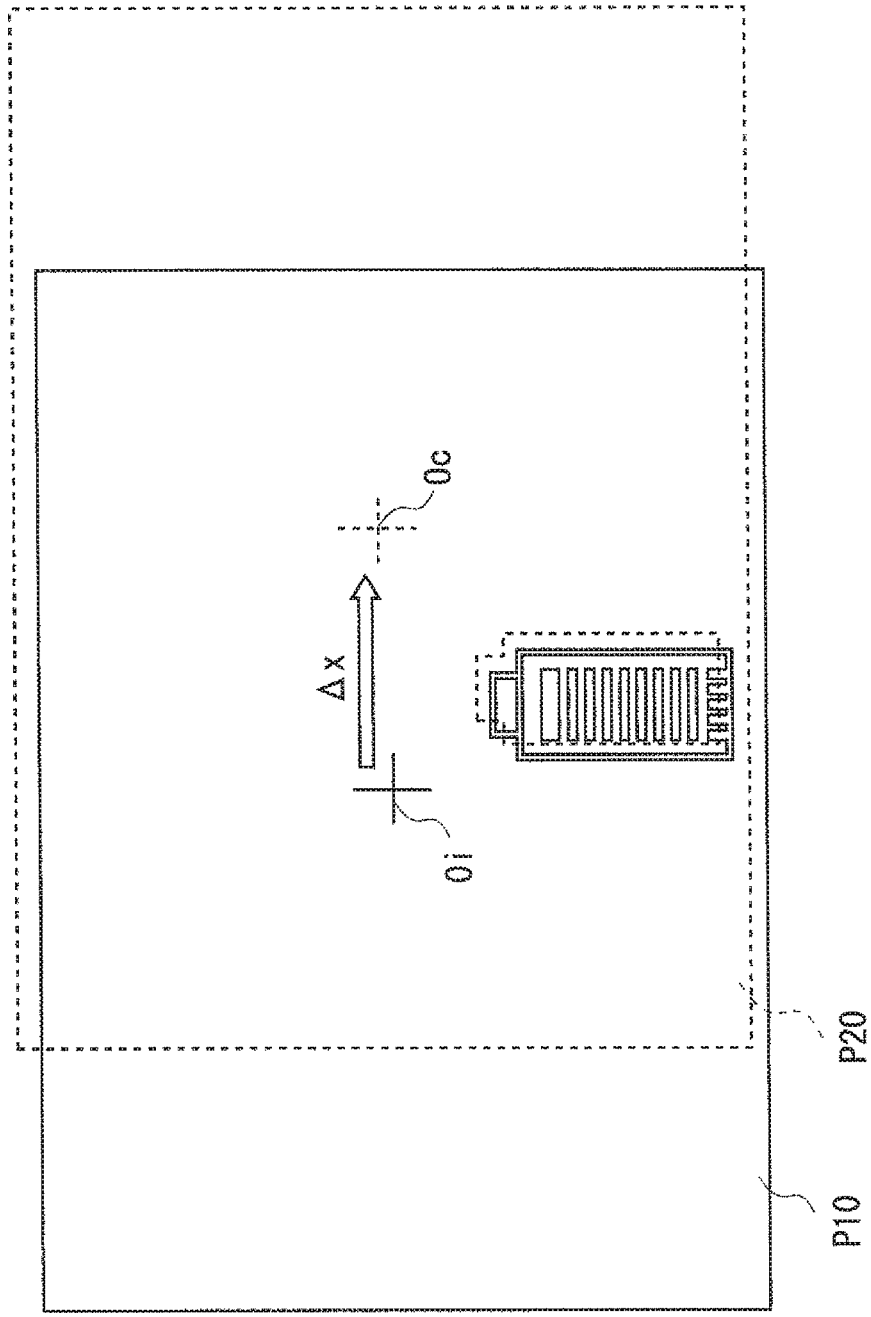
FIG. 15 is a view showing the state where a current image is superimposed on an initial image.

The image matching processing unit 413 compares the initial image P10 with the current image P20 and shifts the current image P20 so that the current image P20 most closely matches the initial image P10. FIG. 15 is a view showing the state where the current image P20 is superimposed on the initial image P10 so that they match. It is assumed that the building 20, which has appeared near the center in the initial image P10, appears to the left in the current image P20. In this case, it is found that the image center Oc of the current image P20 is displaced to the right relative to the image center Oi of the initial image P10.

Figure 16:
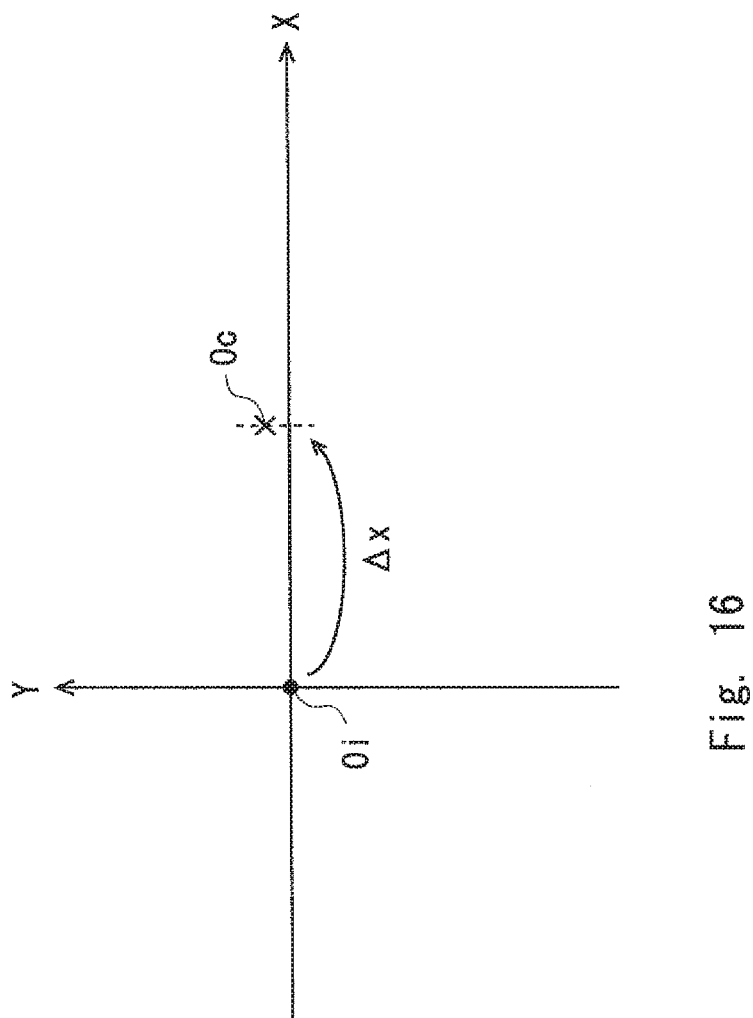
FIG. 16 is a view showing a gap between a current image and an initial image.

The displacement calculation unit 414 calculates the gap between the current image P20 and the initial image P10 based on a result of matching by the image matching processing unit 413 (ST240). In this example, it is calculated how many pixels are left as a gap. As shown in FIG. 16, it is assumed that the crosswise direction is the x-axis direction and the lengthwise direction is the y-axis direction in the display image. The displacement calculation unit 414 calculates the gap by calculating how many ($\Delta X$) pixels in the x-direction and how many ($\Delta Y$) pixels in the y-direction the current image P20 is deviated from the initial image P10. The calculated gaps ($\Delta X$, $\Delta Y$) are displayed on the display screen. It is assumed that the gaps in the x-direction and in the y-direction are displayed below the current image display region R20 (see FIG. 12).

As is understood from FIG. 15 or 16, when the center Oi of the initial image P10 is the origin of the coordinate system, the coordinates of the center Oc of the current image P20 is represented as ($\Delta X$, $\Delta Y$). Accordingly, in this specification, the coordinates ($\Delta X$, $\Delta Y$) are referred to as the position of the current image P20 in some cases. Further, as described earlier, the positions and orientations of the antenna unit 110 and the camera 210 are fixed relative to each other. In other words, the orientation of the antenna unit 110 and the image taken by the camera 210 at the same orientation as that of the antenna unit 110 are in a one-to-one correspondence. Accordingly, in this specification, the coordinates ($\Delta X$, $\Delta Y$) are referred to as the position of the antenna unit, the orientation (angle) of the antenna unit 110 being equated with the position ($\Delta X$, $\Delta Y$) of the image in some cases. (Thus, the displacement calculation unit 414 is referred to as a position calculation unit in some cases.)

After the position of the current image P20 is calculated in this way, the reception strength is detected (ST250). Specifically, the strength of the signal that can be received in the current orientation of the antenna unit 110 is detected. The electric wave signal received by the antenna unit 110 is transmitted to the reception strength detection unit 420 through the transmitting and receiving unit 120 (the receiving circuit 121). The reception strength detection unit 420 obtains the input signal level. For the calculation of the signal level, the reception strength detection unit 420 performs the time-average method. The reception strength obtained in this manner is displayed on the display screen. It is assumed in this example that the display region of the reception strength, together with the gap, is placed below the current image display region R20.

The position of the current image P20 and the reception level at this time are recorded as a pair (ST260). Specifically, the position of the current image P20 calculated by the displacement calculation unit 414 and the reception strength detected by the reception strength detection unit 420 are transmitted to the reception strength recording unit 430. The reception strength recording unit 430 records the position of the current image P20 and the reception strength as a pair.

Further, after the position of the current image P20 and the reception strength are recorded, they are displayed as a graph on the display screen. It is assumed in this example that the upper right region of the display screen is a graph display region R30.

Figure 17:
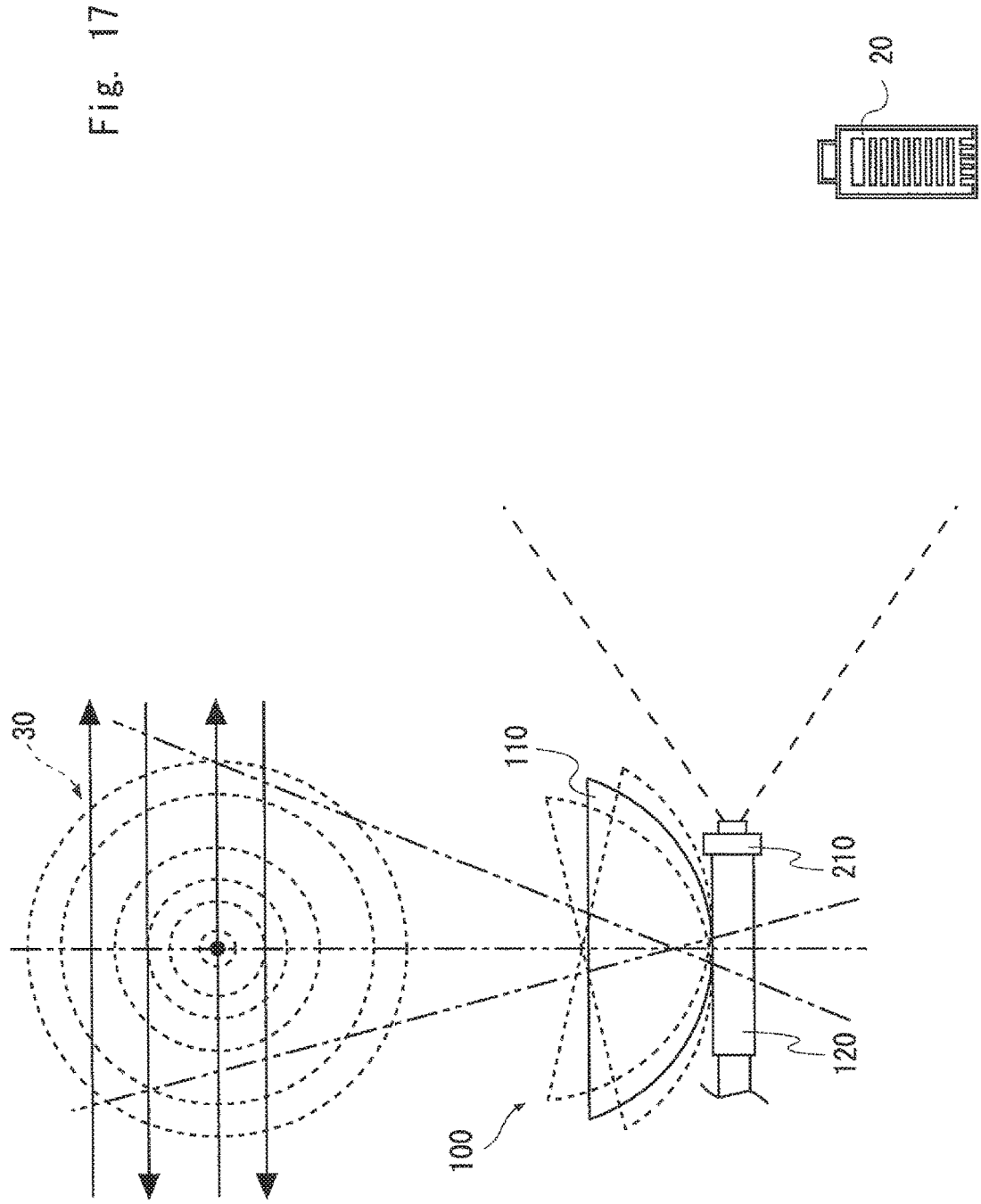
FIG. 17 is a view showing an example of radio emission patterns from an opposite antenna and a step-by-step change of the antenna orientation in accordance with those patterns.

The central control unit 405 repeats the steps from changing the antenna orientation (ST220) to recording the data (ST260) by changing the orientation of the antenna unit 110 little by little. FIG. 17 shows an example of the reception antenna pattern 30 of the antenna device 100 and a step-by-step change of the orientation of the antenna unit 110. In the case where the antenna unit 110 is a parabolic antenna, the reception antenna pattern 30 is a concentric circle. The central control unit 405 measures the reception level by changing the orientation of the antenna unit 110 in various ways within a predetermined range. For example, it may perform a raster scan in the range of ±5° in azimuth and ±5° in elevation. Specifically, for example, as indicated by the arrow A, the elevation is fixed to a certain value, and only the azimuth is shifted from left to right. This means the nut runner 220 is driven. Next, as indicated by the arrow B, the elevation is changed to a little smaller value (that is, the nut runner 230 is driven), and only the azimuth is shifted from right to left (the nut runner 220 is driven). Repeating this process, the orientation of the antenna unit 110 is changed as indicated by the arrow C and the arrow D. By this operation, the graph indicating the relationship between the position of the antenna unit 110 and the reception strength is obtained.

Figure 18:
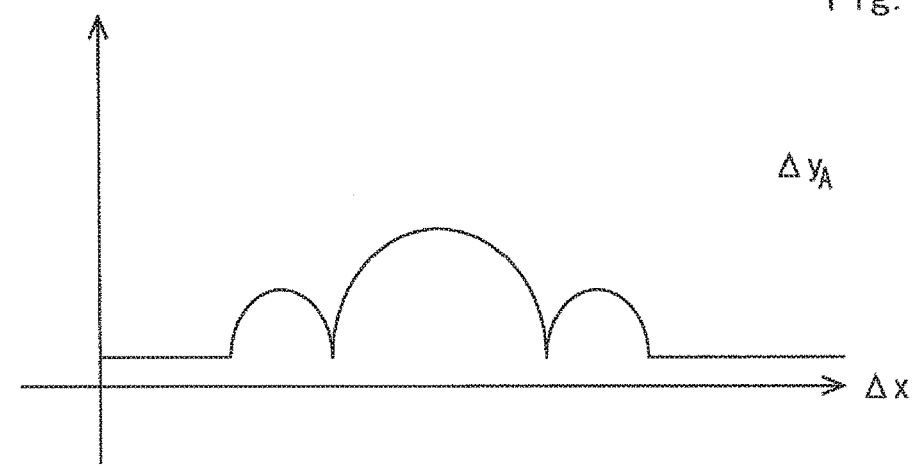
FIG. 18 is a graph showing a change in reception strength with a change in the orientation of the antenna unit.
Figure 19:
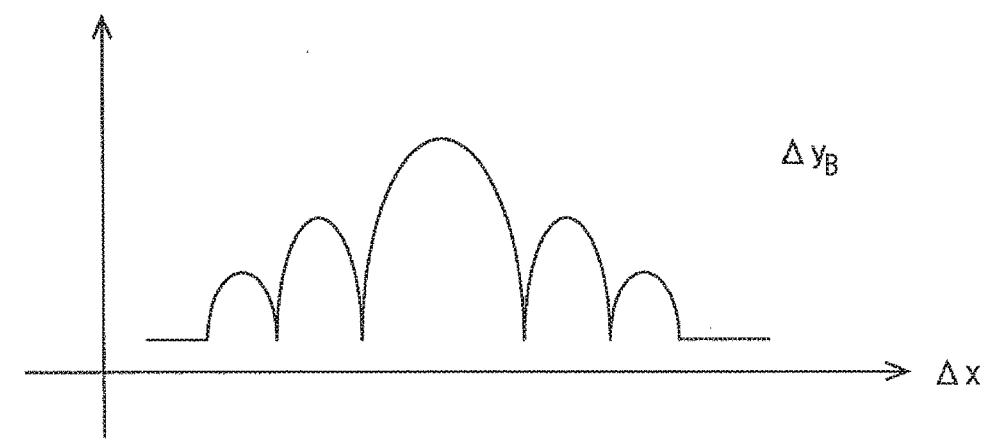
FIG. 19 is a graph showing a change in reception strength with a change in the orientation of the antenna unit.
Figure 20:
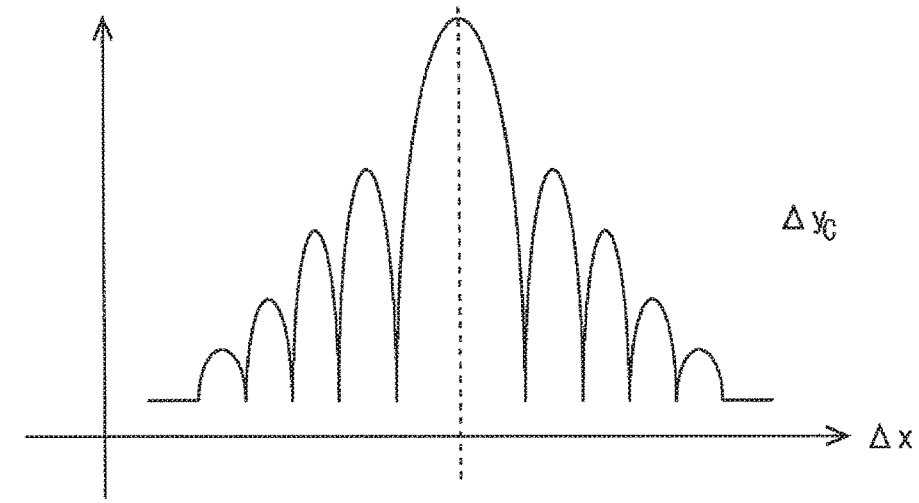
FIG. 20 is a graph showing a change in reception strength with a change in the orientation of the antenna unit.

FIG. 18 is a graph showing a change in reception strength with a change in the orientation of the antenna unit 110 along the arrow A. In FIG. 18, the vertical axis is the reception level, and the horizontal axis is the azimuth. Note that the azimuth is represented by the value of $\Delta X$. Further, because the elevation corresponds to $\Delta y$, FIG. 18 is labeled $\Delta Y_A$ on the right. Likewise, FIG. 19 is the graph corresponding to the arrow B, and FIG. 20 is the graph corresponding to the arrow C. The reception strength reaches its peak when going through the center of the emission pattern as indicated by the arrow C. The graphs of FIGS. 18, 19 and 20 are displayed in the graph display region R30 of the display screen as shown in FIG. 12.

When measurements in a specified range are done (YES in ST270), the peak position is searched for (ST280). The peak search unit 440 searches for the maximum value of the reception strength among the data recorded in the reception strength recording unit 430. The peak search unit 440 finds the maximum value of the reception strength by a search and further reads the position of the antenna unit 110 at which the maximum value of the reception strength is achieved. (As described earlier, the position of the antenna unit 110 and the reception strength are recorded as a pair in the reception strength recording unit 430.) The maximum value of the reception strength and the position ($\Delta X$, $\Delta Y$) of the antenna unit 110 at this time are displayed in a maximum reception direction display region R40 (ST290). As shown in FIG. 12, the reception direction display region R40 is placed in the lower middle part of the display screen. In the following description, the position of the antenna unit 110 at which the maximum value of the reception strength is achieved is referred to as "a peak position" in some cases. The peak position calculated by the peak search unit 440 is recorded in the peak position recording unit 451.

After the orientation (position) of the antenna unit 110 at which the maximum value of the reception strength is achieved is obtained, the step of searching for the best reception direction (ST200) ends. Then, the process proceeds to the step of adjusting the orientation of the antenna unit 110 (ST300).

The step of adjusting the orientation of the antenna unit 110 (ST300) is described hereinafter. The position (peak position) of the antenna unit 110 at which the maximum value of the reception strength is achieved has already been obtained in the step of searching for the best reception direction (ST200), and, in this step of adjusting the orientation of the antenna unit 110 (ST300), the motion controller 400 makes an adjustment to set the orientation of the antenna unit 110 at the peak position.

Figure 21:
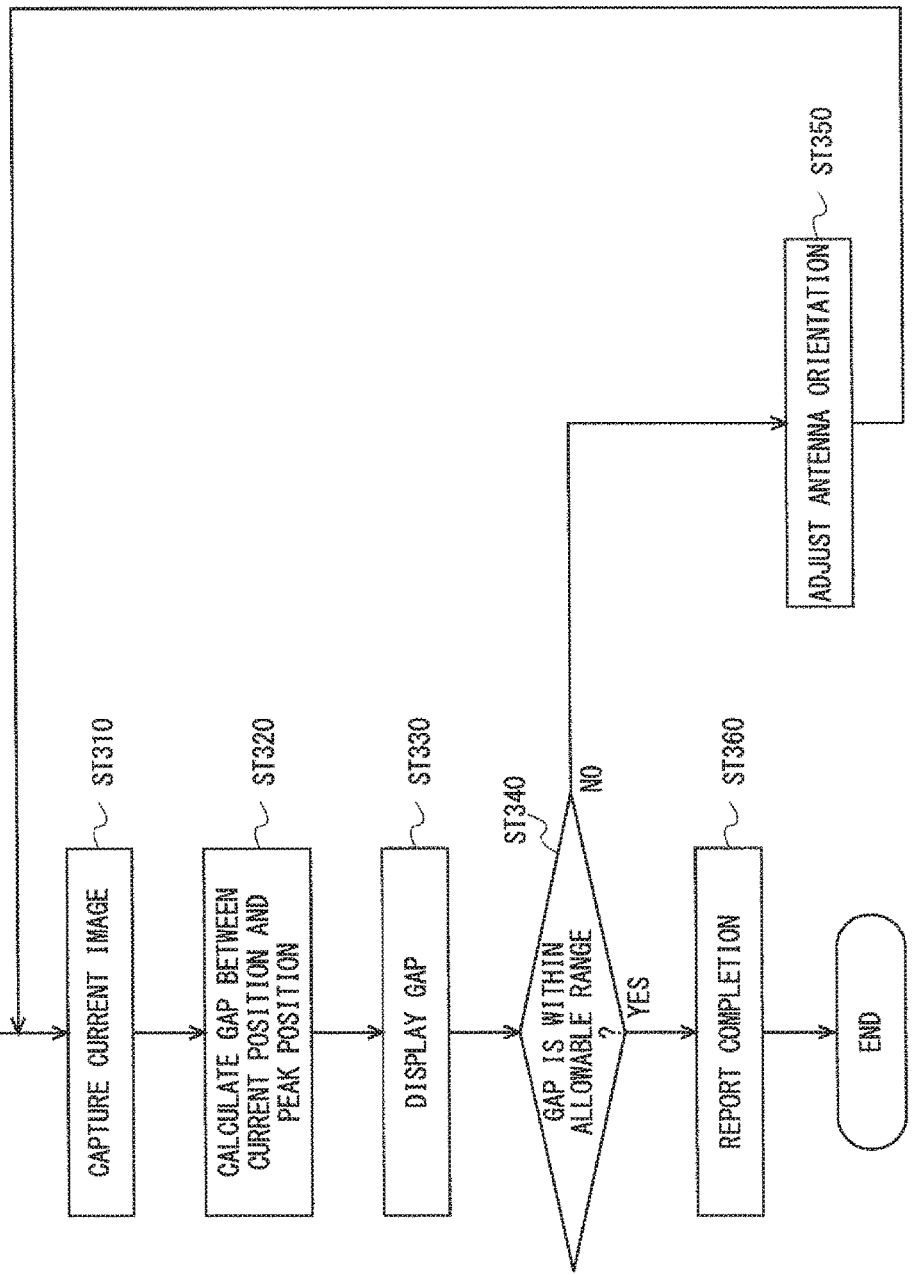
FIG. 21 is a detailed flowchart of steps of adjusting the orientation of the antenna unit.

FIG. 21 is a detailed flowchart of the steps of adjusting the orientation of the antenna unit 110 (ST300). The image capture unit 411 captures the current image (ST310). Specifically, in order to identify the current antenna position, the image that is currently taken by the camera 210 is acquired. Then, a gap between the initial image and the current image is calculated by the image matching processing unit 413 and the displacement calculation unit 414 (ST320) and displayed together with the current image in the current image display region R20.

Figure 22:
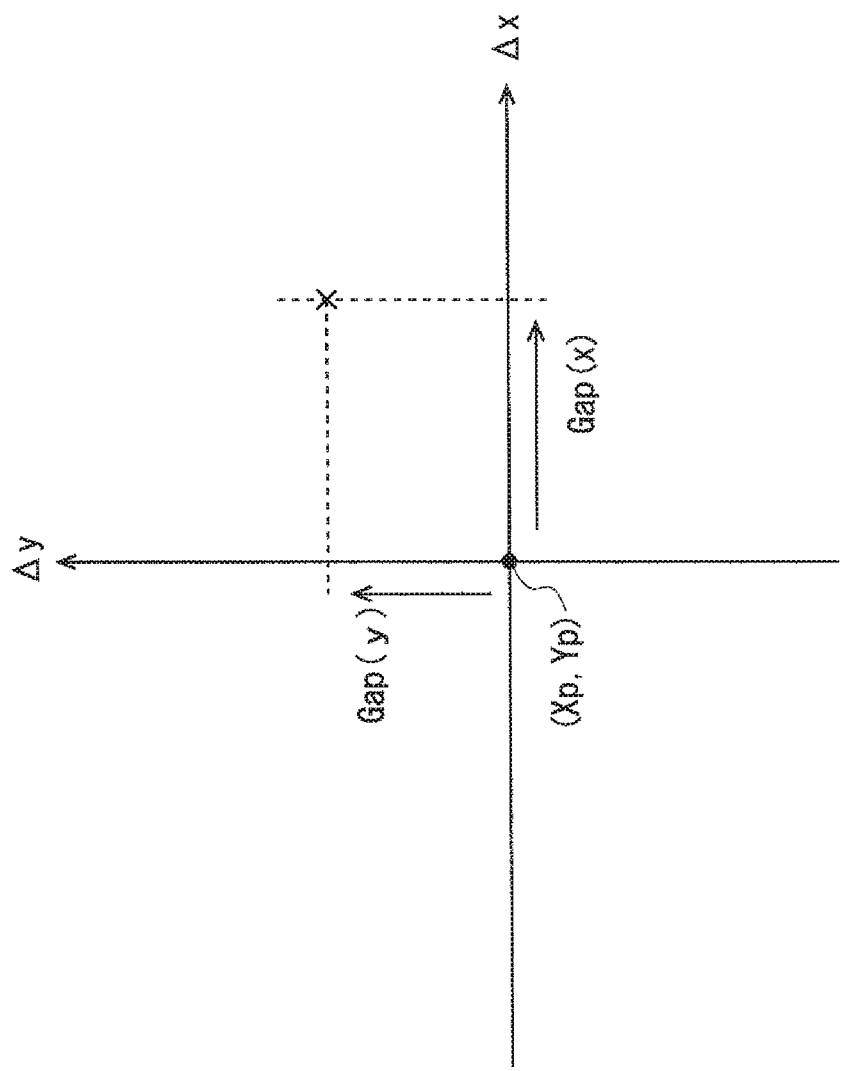
FIG. 22 is a view showing a gap between a current position and a peak position.

Further, the position ($\Delta X$, $\Delta Y$) of the current image is transmitted to the gap calculation unit 452. The gap calculation unit 452 calculates how much the current image is deviated when the peak position is the origin. FIG. 22 shows this calculation. In FIG. 22, the peak position is ($\Delta X_p$, $\Delta Y_p$), which is set as the origin. Then, a gap between the position ($\Delta X$, $\Delta Y$) of the current image and the origin is represented as (Gap(x), Gap(y)). The gap (Gap(x), Gap(y)) calculated in this manner is displayed in a gap display region R50 of the display screen (ST330). It is assumed in this example that the gap display region R50 is placed on the right of the maximum reception direction display region R40.

The central control unit 405 determines whether the gap is within the allowable range (ST340). (It is assumed that the allowable range is predetermined.) In this determination, not only the value of the gap (Gap(x), Gap(y)) but also how much the current reception strength is below the peak value is taken into consideration. Because the amount of gap that is determined from the image differs depending on the distance from the camera 210 to the object, for example, it is not preferred to use only the gap as an index. (A gap for the camera angle 1° differs depending on the distance from the camera 210 to the object.)

When the gap is outside the allowable range (NO in ST340), the central control unit 405 adjusts the orientation of the antenna unit 110 so that it is at the peak position (ST350). (In other words, it drives the nut runners 220 and 230.) Then, the central control unit 405 evaluates how much the position of the antenna unit 110 after adjustment is deviated from the peak position (ST340) again and adjusts the orientation of the antenna unit 110 so that it is at the peak position (ST350). (This equals feedback control with use of the camera 210 and the reception strength detection unit 420 as a sensor). When the central control unit 405 determines that the gap is within the allowable range (YES in ST340), it reports the completion to the worker (ST360). (The completion may be reported by a sound or a message on the display unit 241.)

It is thereby possible to adjust the antenna unit 110 to the orientation where the maximum reception level is achieved.

Finally, the antenna device is fixed. Specifically, the orientation of the antenna unit 110 is fixed by fastening the screws 144, 144, 173 and 173.

There is a possibility that the orientation of the antenna unit 110 is displaced when the screws 144, 144, 173 and 173 are fastened. Thus, it is preferred to keep the image processing unit 410 activated during the work of fastening the screws 144, 144, 173 and 173 and repeat ST310 to ST340. Note that, when the gap is outside the allowable range (ST340), it is preferred to notify the worker of the displacement by a sound or display without driving the nut runners 220 and 230. If the nut runners 220 and 230 are driven after the worker has fastened the screws 144, 144, 173 and 173 to a certain degree, either of the nut runners 220 and 230 or the bolts 160 and 180 can be broken.

After the antenna device is appropriately fixed, the antenna orientation adjustment device 200 is removed from the antenna device 100.

According to the first exemplary embodiment with the above-described structure, the following advantageous effects can be obtained.

(1) According to this exemplary embodiment, it is possible to automatically adjust the orientation of the antenna unit 110 to achieve the maximum reception level. In the existing system, the orientation of the antenna unit 110 is adjusted by a trial-and-error method relying on guesswork, such as seeking to determine the direction where the maximum reception level is achieved by trial and error or repeating fine adjustment in a step-by-step manner.

On the other hand, in the first exemplary embodiment, the maximum reception level is obtained among the data recorded in the reception strength recording unit 430, and then the angle position (peak position) of the antenna unit 110 where the maximum reception level is achieved is obtained as well (ST280). Further, the direction and the amount of gap between the current antenna angle position and the peak position are obtained (ST420). Then, by turning the bolts 160 and 180 using the nut runners 220 and 230 (ST350), the orientation of the antenna unit 110 is adjusted automatically. Therefore, according to the first exemplary embodiment, any worker can quickly and accurately install the antenna device 100 without the need to resort to trial and error and expert skill for turning the adjustment bolt only slightly with fingers feeling.

(2) In the first exemplary embodiment, the angle position of the antenna unit 110 is obtained by comparing the images that are taken by the camera 210. Because it is only necessary to obtain the angle position of the antenna unit 110 as a relative displacement from the initial angle position or the peak position, the imaging direction of the camera 210 is not limited to a specific direction. In other words, the antenna unit 110 and the camera 210 do not need to be aligned. Accordingly, there is no need for costs and labor needed to attach the camera 210 aligned with each antenna device 100.

(3) In this exemplary embodiment, the camera 210 is not used as a sighting device. When the radio emitting direction is deviated even slightly from the antenna plane, even if the antenna orientation is adjusted in the correct direction to the antenna plane of the radio emitting source, it is not necessarily the orientation where the maximum reception level is achieved. On the other hand, in this exemplary embodiment, the antenna unit 110 is orientated to the position where the reception level of radio waves is the highest.

(4) In this exemplary embodiment, only a slight displacement of the antenna unit 110 can be detected by using the image of the camera 210. There is a technique whereby a rotary encoder is added to a moving part of the antenna device and the orientation of the antenna unit detected by an output value of the rotary encoder. (This structure is disclosed in Japanese Unexamined Patent Application Publication No. 2010-278807, for example.) However, in order to detect the rotation of less than 1° by the rotary encoder, the diameter of the rotary encoder needs to be several tens cm, which causes an increase in the size of the antenna device. Further, the rotary encoder having such high accuracy is very expensive. Furthermore, even in the case where the orientation of the antenna unit is detected by the rotary encoder, a displacement transmitting mechanism such as a gear is required between the rotary encoder and the antenna unit. Then, an error due to backlash occurs between gears.

On the other hand, the structure using the camera 210 as in this exemplary embodiment is inexpensive and does not cause an increase in the size of the antenna device 100. Further, as a distance from the camera 210 to an object is longer, a deviation of the object with a change in the angle of the camera 210 is larger. Accordingly, by using the image of the camera 210, it is possible to detect the displacement of the camera 210 (i.e. the antenna unit 110) with a very high resolution. Because the position (displacement) of the antenna unit 110 itself is measured by the camera 210, there is no occurrence of backlash. (In brief, this is the same as the case where a displacement sensor is mounted on an object whose direction is to be adjusted). Because the orientation of the antenna unit can be measured directly in this manner, it is possible to achieve the highly accurate adjustment of the orientation.

(5) Because the displacement of the antenna unit is detected using an image of the camera 210 in this exemplary embodiment, the resolution for displacement detection can be higher as the camera 210 takes an image of a scene as far away as possible. The antenna device is installed in a high place or a place with a fine view for transmitting and receiving radio waves. Accordingly, when the camera 210 is mounted on the antenna device 100, the camera 210 is in the state of being able to take an image of distant objects. Thus, using the camera 210 for detecting the orientation of the antenna unit 110 has a significant effect. In the environment where an image can be taken only a short distance from an object, it is necessary to use a highly accurate optical system in which any aberration, distortion and the like is eliminated in order to detect small displacement in image processing. In this case, it is totally inadequate to use a common digital camera. On the other hand, in the case of using the camera 210 for adjusting the orientation of the antenna unit 110 as in this exemplary embodiment, it is possible to take the image of a distant view, and it is therefore possible to meet demand sufficiently with the low-cost camera 210.

It should be noted that the present invention is not limited to the above-described exemplary embodiment and may be varied in many ways within the scope of the present invention.

Figure 23:
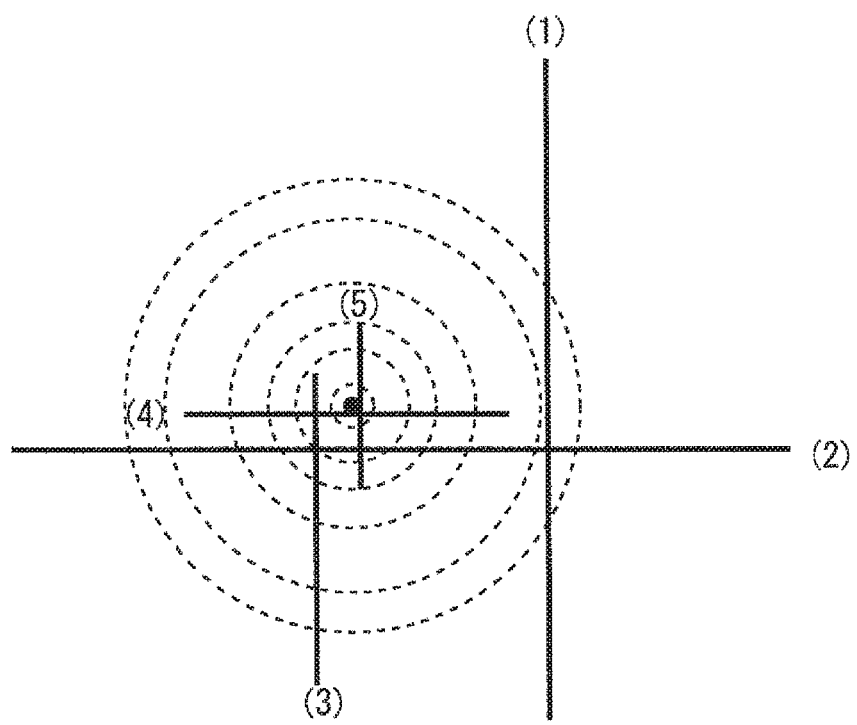
FIG. 23 is a view illustrating another method of searching for a peak position.

When searching for the peak position, although a raster scan over the whole area may be performed as shown in FIG. 17, there are many other variations of the method of searching for the peak position. One example is a method of alternately scanning in the EL direction and the AZ direction and thereby narrowing down the peak position, as shown in FIG. 23. In this method, (1) scan is performed along a certain line in the EL direction and the peak direction is obtained on that line, and then (2) EL is set in the peak direction and scan is performed along the line in the AZ direction. By repeating this operation, it is possible to narrow down and obtain the peak position. (Stated differently, this method is the same as alternately performing the steps ST200 and ST300).

In the motion controller 400, each of the central control unit 405, the image processing unit 410, the reception strength detection unit 420, the reception strength recording unit 430, the peak search unit 440 and the adjustment instruction unit 450 may be dedicated hardware composed of various logical elements. Alternatively, the functions of the central control unit 405, the image processing unit 410, the reception strength detection unit 420, the reception strength recording unit 430, the peak search unit 440 and the adjustment instruction unit 450 may be implemented by incorporating a given program into a computer having a CPU (Central Processing Device), a memory (storage device) and the like. The above-described functional units may be implemented by installing an antenna orientation adjustment program to the memory in the computer having the CPU and the memory through a communication means such as the Internet or a nonvolatile recording medium such as a CD-ROM or a memory card and causing the CPU or the like to operate with the installed program. The program may be installed by directly inserting the memory card, the CD-ROM or the like into the computer or externally connecting equipment that reads such as a storage medium to the computer. Further the program may be supplied and installed through communication by connecting a LAN cable, a wired or wireless communication line to the computer.

In the above-described exemplary embodiment, the azimuth adjustment bolt 160 and the elevation adjustment bolt 180 are described as being examples of the orientation adjustment parts. Typically, the orientation adjustment parts are screws, and the screws are turned to move forward or backward to thereby move the antenna unit. Note that, however, the orientation adjustment parts are not limited thereto as a mater of course, and any structure may be used as long as it can change the orientation of the antenna unit. For example, such a structure can be implemented by combining a cam and a gear in various ways.

Likewise, although the nut runners are described as an example of the motor-driven unit because bolts are used as the orientation adjustment parts, if the orientation adjustment parts are replaced by another thing, the motor-driven unit is changed to fit them as a matter of course.

In some structure of the antenna device, the azimuth and the elevation can be made variable by one orientation adjustment part. Such an antenna device is disclosed in Japanese Unexamined Patent Application Publication No. H5-67909, for example. In this case, only one motor-driven unit (nut runner) is used.

Figure 24:
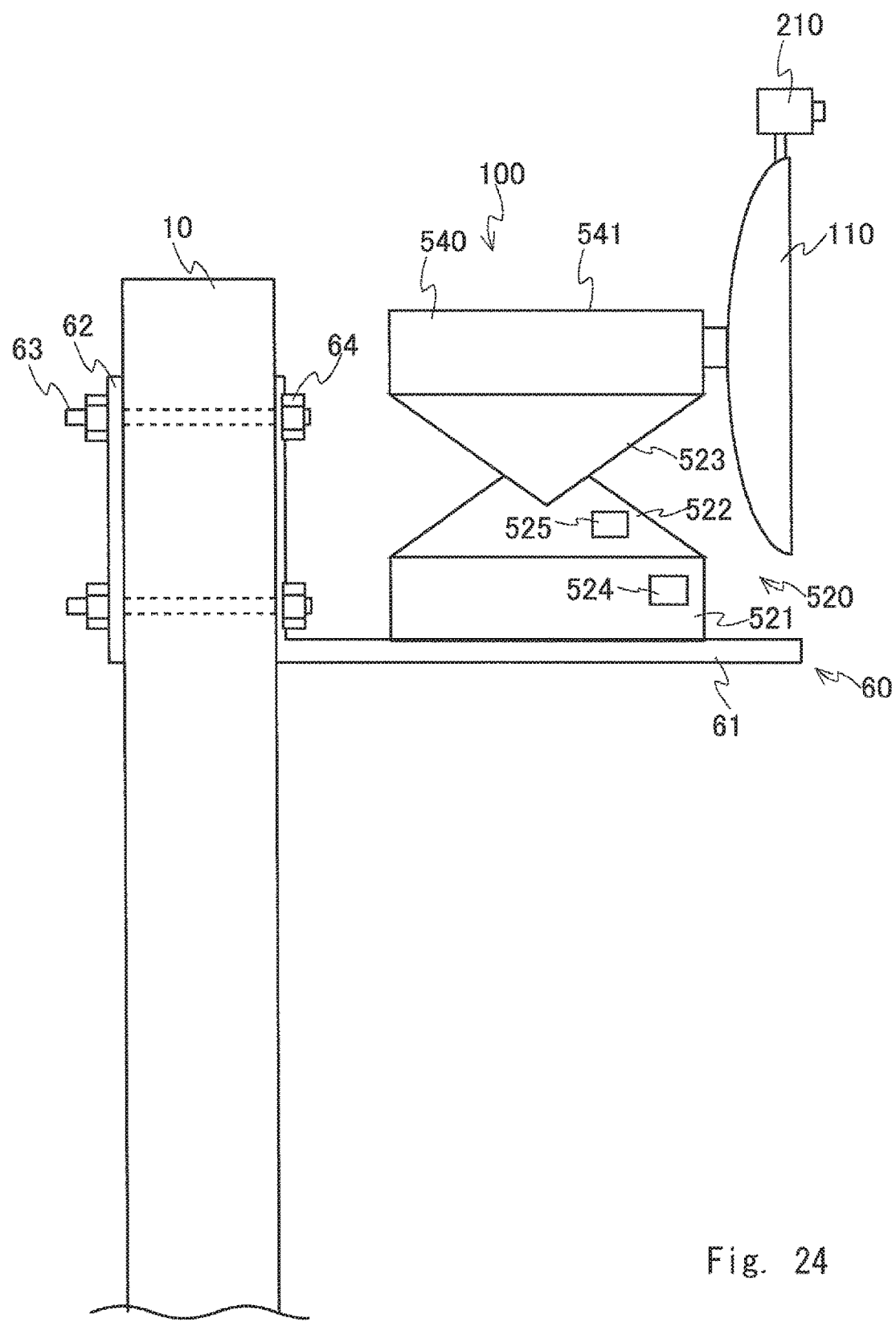
FIG. 24 is a view showing an example in which the antenna device and an orientation adjustment device are combined together.

Although the example in which the antenna device and the antenna orientation adjustment device are separated is described in the above exemplary embodiment, the antenna device and the antenna orientation adjustment device may be combined together. FIG. 24 shows an antenna system in which the antenna device and an orientation adjustment device are combined together, for example. In FIG. 24, the antenna system is placed on an installation surface of an installation base 60. The antenna system has a structure in which the antenna unit 110 is supported by a pan head 520. The pan head 520 includes a base table 521, a rotating table 522 that is supported rotatably on the base table 521, a rotating motor 524 that drives the rotating table 522 to rotate it, a turning table 523 that is supported to be able to turn along the elevation direction on the rotating table 522, and a turning motor 525 that drives the turning table 523 to turn it. A control unit 540 and the antenna unit 110 are supported on the turning table 523. The control unit 540 includes the transmitting and receiving unit 120 and the motion controller 400. (In this case, the pan head serves as the orientation adjustment part.) If the antenna system has a motor, there is no need to attach and detach the nut runner.

This application is based upon and claims the benefit of priority from Japanese patent application No. 2014-019265, filed on Feb. 4, 2014, the disclosure of which is incorporated herein in its entirety by reference.

REFERENCE SIGNS LIST

10 MAST
20 BUILDING
30 RECEPTION ANTENNA PATTERN
100 ANTENNA DEVICE
110 ANTENNA UNIT
120 TRANSMITTING AND RECEIVING UNIT
121 RECEIVING CIRCUIT
122 TRANSMITTING CIRCUIT
123 STORAGE BOX
130 MOUNTING MEANS
140 CLAMP UNIT
141 U-BOLT
142 BRACKET
143 LONG HOLE
144 SCREW
150 AZIMUTH DIRECTION MOVABLE MEMBER
160 AZIMUTH ADJUSTMENT BOLT
170 ELEVATION DIRECTION MOVABLE MEMBER
172 LONG HOLE
173 SCREW
180 ELEVATION ADJUSTMENT BOLT
200 ANTENNA ORIENTATION ADJUSTMENT DEVICE
210 CAMERA
220, 230 NUT RUNNER
220 JIG
221 NUT
222 GEAR
223 PINION
224 MOTOR
225 HOUSING
240 PERSONAL COMPUTER
241 DISPLAY UNIT
400 MOTION CONTROLLER
405 CENTRAL CONTROL UNIT
406 MOTOR DRIVER
410 IMAGE PROCESSING UNIT
411 IMAGE CAPTURE UNIT
412 INITIAL IMAGE RECORDING UNIT
413 IMAGE MATCHING PROCESSING UNIT
414 DISPLACEMENT CALCULATION UNIT (POSITION CALCULATION UNIT)
420 RECEPTION STRENGTH DETECTION UNIT
430 RECEPTION STRENGTH RECORDING UNIT
440 PEAK SEARCH UNIT
450 ADJUSTMENT INSTRUCTION UNIT
451 PEAK POSITION RECORDING UNIT
452 GAP CALCULATION UNIT

The invention claimed is:
1. An antenna orientation adjustment device comprising:
a camera that is fixed relative to an antenna unit;

a motor-driven unit that can be mounted on an orientation adjustment part and changes an orientation of the antenna unit by applying a force of motor power to the orientation adjustment part; and a motion controller that adjusts the orientation of the antenna unit by supplying a drive signal to the motor-driven unit, wherein the camera captures an initial image and a current image;

the motion controller calculates a relative angle position of the antenna unit based on a gap between the current image and the initial image; and the motion controller obtains an angle position of the antenna unit based on a reception strength of radio waves received by the antenna unit and the relative angle position corresponding to the reception strength, and adjusts the angle position of the antenna unit by supplying a drive signal to the motor-driven unit.

2. The antenna orientation adjustment device according to claim 1, wherein the motion controller acquires a relationship between the orientation of the antenna unit and the reception strength, changing the orientation of the antenna unit within a specified range by supplying a drive signal to the motor-driven unit.

3. The antenna orientation adjustment device according to claim 1, wherein the motion controller obtains an angle position of the antenna unit where the reception strength is maximum based on an image taken by the camera and the reception strength of radio waves received by the antenna unit, and adjusts the antenna unit to the angle position where the reception strength is maximum by supplying a drive signal to the motor-driven unit.

4. The antenna orientation adjustment device according to claim 1, wherein the motion controller includes a position calculation unit that calculates a relative angle position of the antenna unit by using an image taken by a camera;

a reception strength detection unit that detects a reception strength of radio waves received by the antenna unit;

a reception strength recording unit that records the relative angle position of the antenna unit and the reception strength at the relative angle position in association with each other;

a peak search unit that searches for a maximum value of the reception strength from data recorded in the reception strength recording unit;

a peak position recording unit that records, as a peak position, an angle position of the antenna unit corresponding to the maximum reception strength obtained by the peak search unit; and a gap calculation unit that calculates a gap between the current angle position of the antenna unit and the peak position, and the motion controller supplies a drive signal to the motor-driven unit so that the gap becomes closer to zero.

5. An antenna system comprising:

an antenna device configured to be able to change an orientation of an antenna unit by applying a force to an orientation adjustment part; and the antenna orientation adjustment device according to claim 1.

6. An antenna orientation adjustment method comprising:

mounting a camera on an antenna device so that a position and an orientation are not displaced relative to an antenna unit of the antenna device;

mounting a motor-driven unit on an orientation adjustment part;

capturing an initial image and a current image by using the camera;

calculating a relative angle position of the antenna unit based on a gap between the current image and the initial image;

calculating an angle position of the antenna unit based on a reception strength of radio waves received by the antenna unit and the relative angle position corresponding to the reception strength; and adjusting the angle position of the antenna unit by supplying a drive signal to the motor-driven unit.

* * * * *